United States Patent
Okada et al.

(10) Patent No.: US 10,072,593 B2
(45) Date of Patent: Sep. 11, 2018

(54) CONTROL DEVICE OF INTERNAL COMBUSTION ENGINE

(71) Applicants: Masahide Okada, Anjou (JP); Masashi Hakariya, Nagoya (JP); Yoshifumi Matsuda, Toyota (JP); Yoshihisa Oda, Toyota (JP); Hiroaki Tsuji, Miyoshi (JP); Tokiji Ito, Toyota (JP); Isao Nakajima, Nisshin (JP); Toshihiro Kato, Toyota (JP); Yuya Yoshikawa, Chiryu (JP)

(72) Inventors: Masahide Okada, Anjou (JP); Masashi Hakariya, Nagoya (JP); Yoshifumi Matsuda, Toyota (JP); Yoshihisa Oda, Toyota (JP); Hiroaki Tsuji, Miyoshi (JP); Tokiji Ito, Toyota (JP); Isao Nakajima, Nisshin (JP); Toshihiro Kato, Toyota (JP); Yuya Yoshikawa, Chiryu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 27 days.

(21) Appl. No.: 14/769,956

(22) PCT Filed: Jan. 21, 2014

(86) PCT No.: PCT/JP2014/000289
§ 371 (c)(1),
(2) Date: Aug. 24, 2015

(87) PCT Pub. No.: WO2014/129108
PCT Pub. Date: Aug. 28, 2014

(65) Prior Publication Data
US 2016/0003181 A1   Jan. 7, 2016

(30) Foreign Application Priority Data

Feb. 25, 2013  (JP) ................................. 2013-034702

(51) Int. Cl.
F02D 41/14   (2006.01)
F02D 41/30   (2006.01)
F02D 41/22   (2006.01)

(52) U.S. Cl.
CPC ..... *F02D 41/1495* (2013.01); *F02D 41/1441* (2013.01); *F02D 41/1454* (2013.01);
(Continued)

(58) Field of Classification Search
CPC ............ F02D 41/1495; F02D 41/1441; F02D 41/1454; F02D 41/1455; F02D 41/1475;
(Continued)

(56) References Cited

U.S. PATENT DOCUMENTS 5,845,489 A * 12/1998 Dohta ..................... F01N 11/00
                                                          123/688
5,927,260 A *  7/1999 Kishimoto .......... F02D 41/1495
                                                          123/688

(Continued)

FOREIGN PATENT DOCUMENTS

JP    2003-014683 A    1/2003
JP    2005-036742 A    2/2005

(Continued)

*Primary Examiner* — Hai Huynh
*Assistant Examiner* — Gonzalo Laguarda
(74) *Attorney, Agent, or Firm* — Hunton Andrews Kurth LLP

(57) ABSTRACT

A control device of an internal combustion engine according to the present invention executes air-fuel ratio control based on an output of an air-fuel ratio sensor provided at an upstream side of a catalyst, with correction based on an output of an oxygen sensor at a downstream side of the catalyst. When it is determined that a degree of an output tendency in a predetermined lean region is not less than a predetermined lean degree, and that a degree of an output tendency in a predetermined rich region is less than a predetermined rich degree based on lean tendency and rich (Continued)

tendency values representing output tendencies of the oxygen sensor, a limit is set to the correction in a direction to more suppress enriching of an air-fuel ratio as a degree is larger in which the output of the oxygen sensor is shifted to a lean side.

3 Claims, 16 Drawing Sheets

(52) U.S. Cl.
CPC ..... *F02D 41/1455* (2013.01); *F02D 41/1475* (2013.01); *F02D 41/222* (2013.01); *F02D 41/30* (2013.01); *F02D 41/1456* (2013.01); *Y02T 10/40* (2013.01)

(58) Field of Classification Search
CPC .... F02D 41/222; F02D 41/30; F02D 41/1456; F02D 41/2454; Y02T 10/47
USPC ................ 123/445, 443, 672; 701/103, 109; 60/276
See application file for complete search history.

(56) References Cited

U.S. PATENT DOCUMENTS

| | | | |
|---|---|---|---|
| 6,588,200 B1* | 7/2003 | Surnilla | F02D 41/0275 60/274 |
| 2001/0045089 A1* | 11/2001 | Kobayashi | F02D 41/0295 60/274 |
| 2003/0005746 A1 | 1/2003 | Iwazaki et al. | |
| 2009/0211350 A1 | 8/2009 | Iwazaki et al. | |
| 2014/0075924 A1* | 3/2014 | Aoki | F02D 41/0235 60/285 |

FOREIGN PATENT DOCUMENTS

| | | |
|---|---|---|
| JP | 2009-203881 A | 9/2009 |
| JP | 2009-293468 A | 12/2009 |
| JP | 2010-014082 A | 1/2010 |

* cited by examiner

CONTROL DEVICE OF INTERNAL COMBUSTION ENGINE

CROSS-REFERENCE TO RELATED APPLICATIONS

This is a national phase application based on the PCT International Patent Application No. PCT/JP2014/000289 filed Jan. 21, 2014, claiming priority to Japanese Patent Application No. 2013-034702 filed Feb. 25, 2013, the entire contents of both of which are incorporated herein by reference.

TECHNICAL FIELD

The present invention relates to a control device of an internal combustion engine in which an oxygen sensor is provided in an exhaust passage.

BACKGROUND ART

Generally, in an internal combustion engine provided with an exhaust purification system utilizing a catalyst, it is essential to control a mixing ratio of air and fuel of an air-fuel mixture burnt in the internal combustion engine, i.e., an air-fuel ratio, in order to perform purification of harmful components in exhaust gas by the catalyst with high efficiency. In order to perform such control of the air-fuel ratio, in the internal combustion engine as described above, sensors that generate outputs according to oxygen concentrations of the exhaust gas are provided at upstream and downstream sides of the catalyst of an exhaust passage, i.e., a catalytic purification device, and air-fuel ratio feedback control is carried out so that the air-fuel ratio is made to follow a target air-fuel ratio based on outputs of them. For example, a so-called wide-area air-fuel ratio sensor is provided at the upstream side of the catalyst, and a so-called oxygen sensor is provided at the downstream side thereof.

A general oxygen sensor is disposed in the exhaust passage so that an inner surface of a detection element of the oxygen sensor is exposed to the atmospheric air, and that an outer surface thereof is exposed to the exhaust gas, and when a difference is generated in oxygen partial pressures of the atmospheric air and the exhaust gas, in short, a difference is generated in oxygen concentrations, oxygen ions flow inside the detection element from a side with high oxygen concentration to a side with low oxygen concentration, and thus an electromotive force is generated. However, when a defect occurs in the detection element of the oxygen sensor, i.e., when an element crack occurs, the exhaust gas flows inside the detection element, and the difference is not generated in the oxygen concentration between inside and outside the detection element. As a result of it, the oxygen sensor generates an output similar to an output at the time of so-called lean combustion in which oxygen increases in the exhaust gas. That is, when the defect occurs in the detection element, a degree increases in which the oxygen sensor generates the output similar to the output at the time of lean combustion. Consequently, it is possible to detect that the detection element of the oxygen sensor has a defective abnormality based on a degree of an output tendency of a lean side of the oxygen sensor.

As described above, when the detection element of the oxygen sensor has the defective abnormality, the output of the oxygen sensor does not generally correspond to an oxygen concentration of the exhaust gas, and thus when the above-described air-fuel ratio control is performed simply based on the output of the oxygen sensor, emission is deteriorated. Particularly, since such an oxygen sensor tends to generate an output similar to the output at the time of lean combustion as mentioned above, correction to excessively enrich an air-fuel ratio may be performed based on the output of the oxygen sensor in the air-fuel ratio control.

For example, PTL 1 discloses an air-fuel ratio control device for preventing emission deterioration as described above. This device has a configuration that determines that a possibility of abnormality is higher as a degree is larger in which appearance frequency distribution of an output value of an oxygen sensor provided at a downstream side of an exhaust purification catalyst is shifted to a lean side, and sets a limit to a correction amount to air-fuel ratio control in a direction to suppress enriching of an air-fuel ratio according to a degree of the possibility of abnormality.

CITATION LIST

Patent Literature

PTL 1: Japanese Patent Laid-Open No. 2005-36742

SUMMARY OF INVENTION

Technical Problem

By the way, raising a determination criterion (detection criterion) of the defective abnormality of the oxygen sensor is needed due to further tightening of emission regulations in recent years.

Meanwhile, a time when the degree increases in which the oxygen sensor generates the output similar to the output at the time of lean combustion is not limited to a time when the detection element of the oxygen sensor has the defective abnormality. In an internal combustion engine having a plurality of cylinders, i.e., a so-called multi-cylinder internal combustion engine, when a degree of variation of air-fuel ratios among cylinders is high, an oxygen sensor provided in an exhaust passage tends to generate an output similar to an output at the time of lean combustion. Generally, in such an internal combustion engine, since air-fuel ratio control is usually performed to all the cylinders using a same control amount, actual air-fuel ratios may vary among the cylinders even if the air-fuel ratio control is executed. If the degree of variation is small at this time, it can be absorbed by air-fuel ratio feedback control, and purification treatment of harmful components in exhaust gas can be performed also by a catalyst, so that emission is not affected, and there occurs no problems in particular. However, for example, when fuel injection systems of some cylinders or a valve train of an intake valve breaks down, and the air-fuel ratios among the cylinders greatly vary, an air-fuel ratio sensor at an upstream side of the catalyst has a strong tendency to generate an output similar to an output of a richer air-fuel ratio than a theoretical air-fuel ratio by an effect of hydrogen components in the exhaust gas, and the air-fuel ratio is easily shifted to a lean side by the air-fuel ratio control. Consequently, due to this, a degree increases in which the oxygen sensor at a downstream side of the catalyst generates an output similar to the output at the time of lean combustion. Accordingly, in the internal combustion engine provided with a configuration that detects that the detection element of the oxygen sensor has the defective abnormality based on the degree of the output tendency of the lean side of the oxygen sensor, there is a possibility of erroneously detecting that the defective abnormality has occurred in the detection element of the oxygen sensor when the degree of variation of the air-fuel ratios among cylinders is high. Particularly, the determination criterion of the defective abnormality of the oxygen sensor is raised, and thereby the possibility of the erroneous detection can be further increased.

As described above, under a situation where occurrence of the defective abnormality in the oxygen sensor is erroneously detected although there is no defective abnormality in the oxygen sensor when the degree of variation of the air-fuel ratios among cylinders is high, in an internal combustion engine provided with the air-fuel ratio control device as shown in PTL 1, a limit may be set to a correction amount with respect to air-fuel ratio control according to the degree of variation of the air-fuel ratios among cylinders. Such setting of the limit cannot contribute to improvement of emission.

Therefore, the present invention has been devised in view of the above circumstances, and an object thereof is to perform air-fuel ratio control more suitably based on the output of the oxygen sensor provided at the downstream side of the exhaust purification catalyst of the exhaust passage.

Solution to Problem

According to one aspect of the present invention, there is provided a control device of an internal combustion engine including:

air-fuel ratio control means configured to execute air-fuel ratio control based on an output of an air-fuel ratio sensor provided at an upstream side of an exhaust purification catalyst of an exhaust passage, the air-fuel ratio control means executing correction to the air-fuel ratio control by a correction amount set based on an output of an oxygen sensor provided at a downstream side of the exhaust purification catalyst;

output tendency value calculation means configured to calculate a value that represents an output tendency of the oxygen sensor based on the output of the oxygen sensor, the output tendency value calculation means calculating a lean tendency value that represents a lean output tendency in a predetermined lean region closer to a lean side than a theoretical air-fuel ratio and a rich tendency value that represents a rich output tendency in a predetermined rich region closer to a rich side than the theoretical air-fuel ratio in a predetermined time;

determination means configured to determine whether or not a degree of the lean output tendency in the predetermined lean region is not less than a predetermined lean degree based on the lean tendency value calculated by the output tendency value calculation means, and determine whether or not a degree of the rich output tendency in the predetermined rich region is less than a predetermined rich degree based on the rich tendency value calculated by the output tendency value calculation means; and limit setting means configured to set a limit to the correction to the air-fuel ratio control in a direction to more suppress enriching of an air-fuel ratio as a degree is larger in which the output of the oxygen sensor is shifted to the lean side, when it is determined by the determination means that the degree of the lean output tendency in the predetermined lean region is not less than the predetermined lean degree, and that the degree of the rich output tendency in the predetermined rich region is less than the predetermined rich degree.

Preferably, the limit setting means uses the lean tendency value calculated by the output tendency value calculation means as a value representing the degree in which the output of the oxygen sensor is shifted to the lean side, and sets the limit to the correction based on the lean tendency value.

When temperature detection means configured to detect an element temperature of the oxygen sensor is further provided, the output tendency value calculation means may calculate at least the rich tendency value based on the output of the oxygen sensor when the element temperature of the oxygen sensor detected by the temperature detection means is not more than a predetermined temperature having a correspondence relation with a lean-side boundary value of the predetermined rich region. Alternatively, when the temperature detection means configured to detect the element temperature of the oxygen sensor is further provided, rich region setting means configured to set the lean-side boundary value of the predetermined rich region based on the element temperature of the oxygen sensor detected by the temperature detection means may be further provided.

Advantageous Effects of Invention

According to the present invention having the above-described configuration, when it is determined that the degree of the output tendency in the predetermined lean region of the oxygen sensor is not less than the predetermined lean degree, and that the degree of the output tendency in the predetermined rich region of the oxygen sensor is less than the predetermined rich degree, the limit is set to the correction to the air-fuel ratio control in the direction to more suppress enriching of the air-fuel ratio as the degree is larger in which the output of the oxygen sensor is shifted to the lean side. Accordingly, a time when abnormality has occurred in the oxygen sensor is appropriately discriminated, and at that time, it becomes possible to suitably perform the air-fuel ratio control based on the output of the oxygen sensor.

DESCRIPTION OF EMBODIMENTS

Hereinafter, embodiments of the present invention will be explained based on accompanying drawings. First, a first embodiment will be explained.

Figure 1:
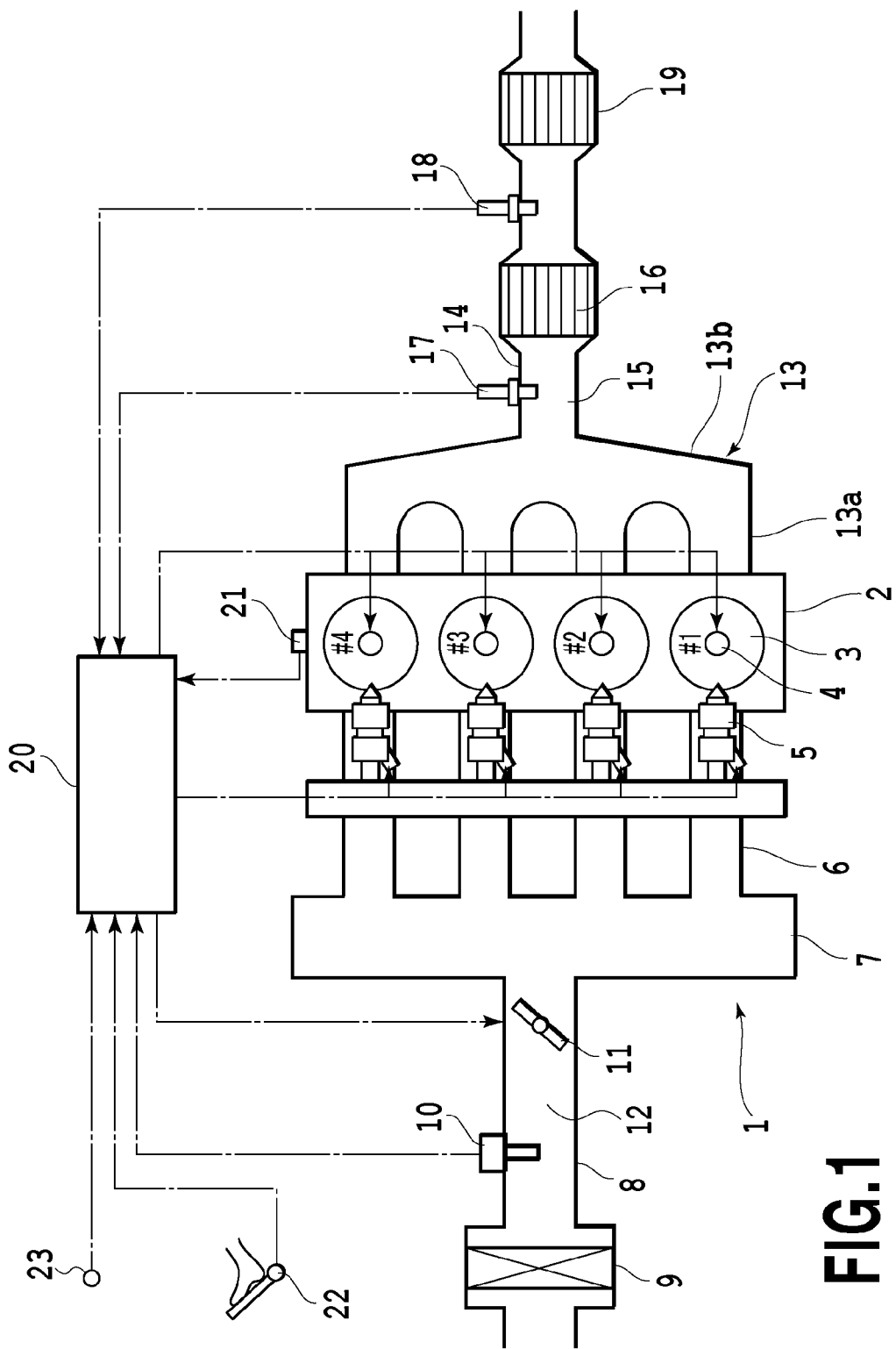
FIG. 1 is a schematic view of an internal combustion engine according to a first embodiment of the present invention.

FIG. 1 is a schematic view of an internal combustion engine according to the first embodiment. An internal combustion engine (hereinafter, an engine) 1 burns an air-fuel mixture of fuel and air inside a combustion chamber 3 formed in an engine body 2 including a cylinder block, and generates power by reciprocating a piston in a cylinder. The engine 1 of the embodiment is a multi-cylinder internal combustion engine for automobiles, and more specifically, is a spark ignition type internal combustion engine of an in-line four-cylinder, i.e., a gasoline engine. However, the internal combustion engine to which the present invention can be applied is not limited to the above, and the number of cylinders, types, etc. are not particularly limited as long as the engine is an internal combustion engine having a plurality of cylinders. Note that the engine 1 is mounted on an unillustrated vehicle.

Although unillustrated, an intake valve that opens and closes an intake port, and an exhaust valve that opens and closes an exhaust port are arranged at a cylinder head of the engine 1 for each cylinder, and each intake valve and each exhaust valve are opened and closed by a camshaft. A spark plug 4 for igniting the air-fuel mixture in the combustion chamber 3 is attached to a top portion of the cylinder head for each cylinder. In addition, an injector (a fuel injection valve) 5 that directly injects fuel in the combustion chamber 3 is arranged at the cylinder head for each cylinder.

The intake port of each cylinder is connected to a surge tank 7, which is an intake air collection chamber, through a branch pipe 6 of the each cylinder. An intake pipe 8 is connected to an upstream side of the surge tank 7, and an air cleaner 9 is provided at an upstream end of the intake pipe 8. Additionally, an air flow meter 10 as intake air amount detection means for detecting an intake air amount, and an electronically controlled throttle valve 11 are incorporated in the intake pipe 8 in that order from the upstream side. The intake port, the branch pipe 6, the surge tank 7, and the intake pipe 8 form a part of an intake air passage 12, respectively.

Meanwhile, the exhaust port of each cylinder is connected to an exhaust manifold 13. The exhaust manifold 13 includes a branch pipe 13a of each cylinder that forms an upstream portion of the exhaust manifold 13, and an exhaust collection portion 13b that forms a downstream portion thereof. An exhaust pipe 14 is connected to a downstream side of the exhaust collection portion 13b. The exhaust port, the exhaust manifold 13, and the exhaust pipe 14 form a part of an exhaust passage 15, respectively. An exhaust purification catalyst, which is a so-called three-way catalyst, i.e., a catalytic purification device 16, is attached to the exhaust pipe 14.

Sensors 17, 18 that generate outputs according to oxygen concentrations in exhaust gas are installed at upstream and downstream sides of the catalyst 16. The sensor (upstream sensor) 17 of the upstream side of the catalyst 16 is referred to as a pre-catalyst sensor 17 here, and the sensor (downstream sensor) 18 of the downstream side of the catalyst 16 is referred to as a post-catalyst sensor 18 here. These pre-catalyst sensor 17 and post-catalyst sensor 18 are installed at positions right before and after the catalyst 16 in the exhaust passage, and generate the outputs based on the oxygen concentrations in the exhaust gas, respectively.

Note that in the first embodiment, an exhaust purification catalyst including a three-way catalyst similar to the catalyst 16, i.e., a catalytic purification device 19, is attached also at a downstream side of the post-catalyst sensor 18.

The above-mentioned spark plug 4, injector 5, throttle valve 11, etc. are electrically connected to an electronic control unit (hereinafter, an ECU) 20 configured as a control device, i.e., control means (a control unit). The ECU 20 includes: a CPU; storage devices such as a ROM and a RAM; an input/output port; etc., all of which are not illustrated. In addition, as can be seen, in addition to the above-mentioned air flow meter 10, pre-catalyst sensor 17, and post-catalyst sensor 18, a crank angle sensor 21 for detecting a crank angle of the engine 1; an accelerator opening degree sensor 22 for detecting an accelerator opening degree; a vehicle speed sensor 23 for detecting a speed of a vehicle on which the engine 1 is mounted, i.e., a vehicle speed; and other various sensors are electrically connected to the ECU 20 through an unillustrated A/D converter etc. The ECU 20 controls the spark plug 4, the injector 5, the throttle valve 11, etc. based on outputs of the various sensors so as to obtain desired engine output to thereby control ignition timing, a fuel injection amount, fuel injection timing, a throttle opening degree, etc. Note that the throttle opening degree is controlled to be an opening degree according to the accelerator opening degree, and that the throttle opening degree also becomes larger as the accelerator opening degree becomes larger.

As described above, the ECU 20 performs respective functions of fuel injection control means (a fuel injection control unit), ignition control means (an ignition control unit), intake air amount control means (an intake air amount control unit) and the like. Additionally, as is apparent from the following explanation, the ECU 20 performs each function of air-fuel ratio control means (an air-fuel ratio control unit), output tendency value calculation means (an output tendency value calculation unit), determination means (a determination unit), and limit setting means (a limit setting unit). Note that the determination means (determination unit) includes lean determination means (a lean determination unit) and rich determination means (a rich determination unit).

Additionally, the ECU 20 detects an amount of intake air per unit time, i.e., an intake air amount, based on an output signal from the air flow meter 10. The ECU 20 detects a crank angle itself and also detects the number of rotations of the engine 1 based on a crank pulse signal from the crank angle sensor 21. Here, "the number of rotations" means the number of rotations per unit time, and has the same meaning as a rotation speed. Additionally, the ECU 20 usually sets a fuel injection amount (or a fuel injection time) using data etc. previously stored in a storage device based on the intake air amount and the engine rotation speed, i.e., an engine operation state. Fuel injection from the injector 5 is then controlled based on the fuel injection amount.

Figure 2:
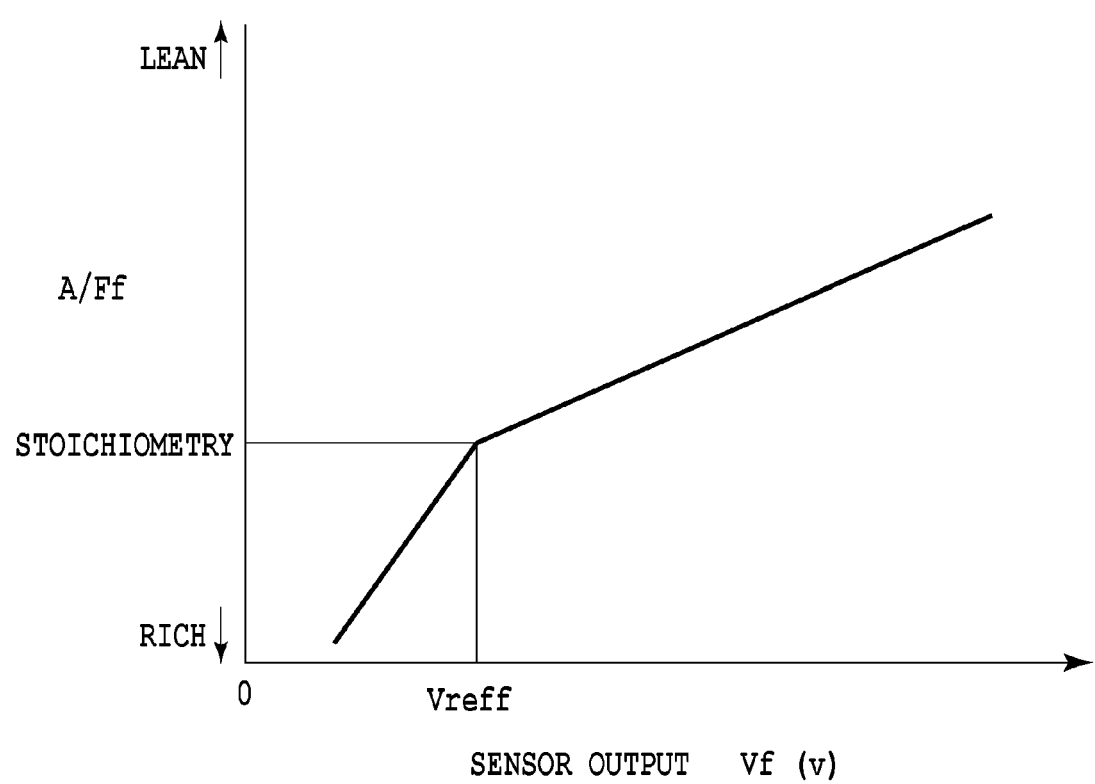
FIG. 2 is a graph showing an output characteristic of a pre-catalyst sensor.

By the way, the pre-catalyst sensor 17 is made of a so-called wide-area air-fuel ratio sensor, and can continuously detect an air-fuel ratio comparatively over a wide range. An output characteristic of the pre-catalyst sensor 17 is shown in FIG. 2. As can be seen, the pre-catalyst sensor 17 outputs a voltage signal Vf with magnitude proportional to an oxygen concentration in the exhaust gas corresponding to an air-fuel ratio (a pre-catalyst air-fuel ratio A/Ff) of a burnt air-fuel mixture. An output voltage when the air-fuel ratio is stoichiometric (a theoretical air-fuel ratio, for example, A/F=14.6) is Vreff (for example, approximately 3.3 V). When the air-fuel ratio is leaner than the stoichiometry, the output voltage of the pre-catalyst sensor 17 is higher than the stoichiometric equivalent value Vreff, while when the air-fuel ratio is richer than the stoichiometry, the output voltage of the pre-catalyst sensor 17 is lower than the stoichiometric equivalent value Vreff.

Figure 3:
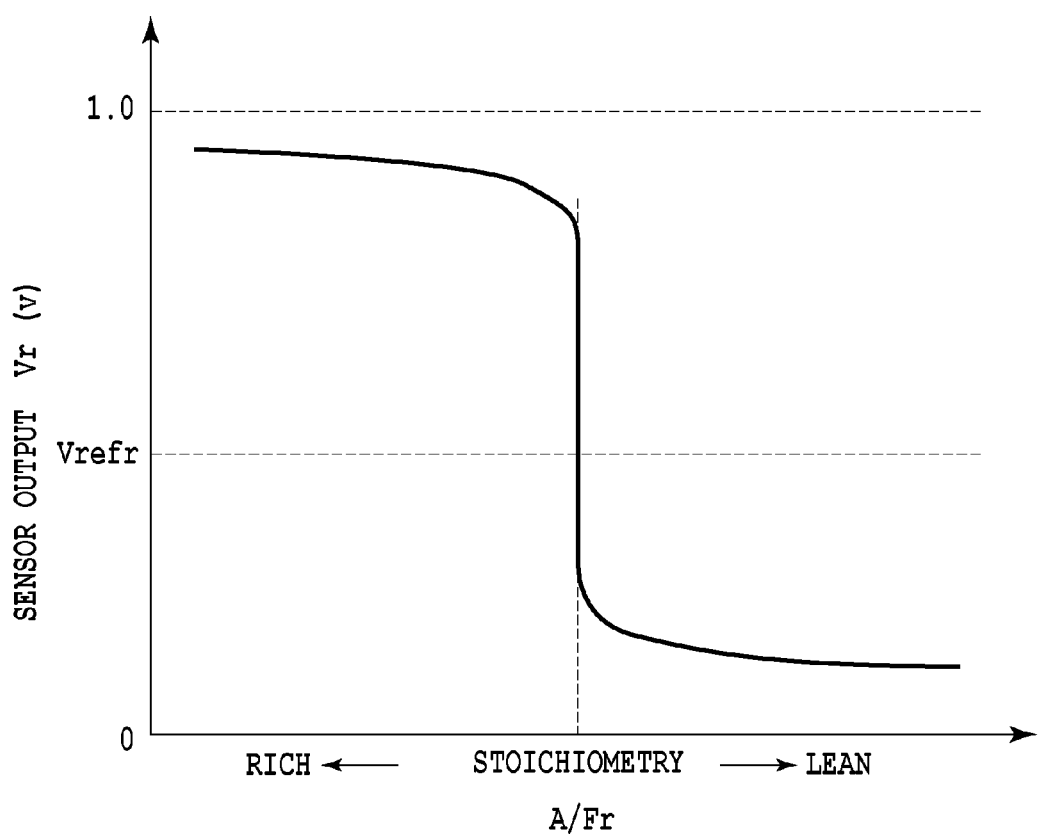
FIG. 3 is a graph showing an output characteristic of a post-catalyst sensor.

On the other hand, the post-catalyst sensor 18 is made of a so-called oxygen ($O_2$) sensor, and has a characteristic that an output value rapidly changes after the stoichiometry. An output characteristic of the post-catalyst sensor 18 is shown in FIG. 3. As can be seen, the post-catalyst sensor 18 outputs a signal according to an oxygen concentration in the exhaust gas corresponding to an air-fuel ratio (a post-catalyst air-fuel ratio A/Fr) of a burnt air-fuel mixture, and an output voltage when the air-fuel mixture is the stoichiometry, i.e., a stoichiometric equivalent value (stoichiometric equivalent voltage), is Vrefr (for example, 0.45 V). An output voltage of the post-catalyst sensor 18 changes within a predetermined range (for example, 0 to 1 V). Generally, when the air-fuel ratio is leaner than the stoichiometry, an output voltage Vr of the post-catalyst sensor 18 is lower than the stoichiometric equivalent value Vrefr, while when the air-fuel ratio is richer than the stoichiometry, the output voltage Vr of the post-catalyst sensor 18 is higher than the stoichiometric equivalent value Vrefr.

The catalysts 16, 19 are made of three-way catalysts, respectively, and simultaneously purify NOx, HC, and CO, which are harmful components in the exhaust gas, when the air-fuel ratio A/F of the exhaust gas flowing into the respective catalysts 16, 19 is near the stoichiometry. A width (window) of the air-fuel ratio with which these three components can be simultaneously purified with high efficiency is relatively narrow.

Consequently, at the time of normal operation of the engine 1, air-fuel ratio control (stoichiometric control) for controlling near the stoichiometry detected air-fuel ratio of the exhaust gas flowing into the upstream catalyst 16 is executed by the ECU 20. In this air-fuel ratio control, air-fuel ratio control (hereinafter, main air-fuel ratio control) is executed based on the output of the pre-catalyst sensor 17, and correction to the main air-fuel ratio control is executed by a correction amount set based on the output of the post-catalyst sensor 18. In the main air-fuel ratio control, the air-fuel ratio (specifically, the fuel injection amount) of the air-fuel mixture is feedback controlled so that the air-fuel ratio detected based on the output of the pre-catalyst sensor 17 becomes the stoichiometry, which is a predetermined target air-fuel ratio. Correction to the main air-fuel ratio control is then performed so that the air-fuel ratio detected based on the output of the post-catalyst sensor 18 becomes the stoichiometry. Such correction can be here referred to as auxiliary air-fuel ratio control with respect to the main air-fuel ratio control. In the embodiment, the above-described predetermined target air-fuel ratio, i.e., a reference value (target value) of the air-fuel ratio, is the stoichiometry, and a fuel injection amount equivalent to the stoichiometry (it is called a stoichiometric equivalent amount) is a reference value (target value) of the fuel injection amount. However, the reference values of the air-fuel ratio and the fuel injection amount can also be set to be other values. Note that a same control amount is uniformly used for each cylinder in the air-fuel ratio control.

Additionally, a limit is set to the above-described correction based on the output of the post-catalyst sensor 18 in the above-described air-fuel ratio control. This limit is set according to a degree of abnormality of the post-catalyst sensor 18, which will be mentioned in detail later, and means providing limit guard in the above-described correction amount.

Figure 4A:
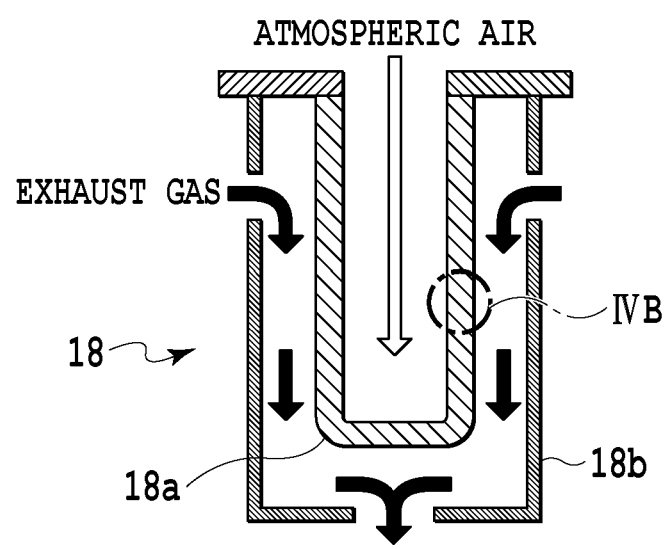
FIG. 4A is a schematic diagram showing a concept structure of an oxygen sensor, which is the post-catalyst sensor.
Figure 4B:
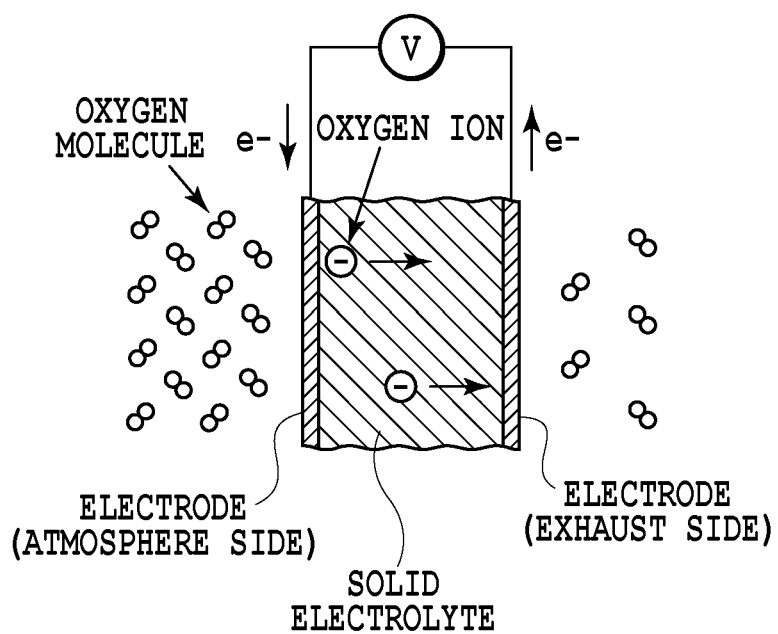
FIG. 4B is an enlarged schematic diagram of a region surrounded by an IVB portion of FIG. 4A.

Here, a configuration of the post-catalyst sensor 18 and abnormality thereof will be explained. The post-catalyst sensor 18, which is an oxygen sensor, is here configured as a cylindrical oxygen sensor using a solid electrolyte. The post-catalyst sensor 18 includes a cylindrical detection element 18a arranged so as to project in the exhaust passage 15 as a concept structure of the post-catalyst sensor 18 being shown in FIG. 4A. An inner surface of the detection element 18a is exposed to the atmospheric air (air), and an outer surface thereof is exposed to the exhaust gas flowing through a sensor cover 18b. In addition, the detection element 18a is formed of a solid electrolyte whose inner and outer surfaces are covered with electrodes as a cross-sectional structure of apart of the detection element 18a being schematically shown in FIG. 4B. The solid electrolyte indicates a solid substance inside which oxygen can move in a state of being ionized, and zirconia is utilized here. Note that the solid electrolyte may include another material.

Now, when a difference is generated in an oxygen partial pressure between the atmosphere air inside the detection element 18a as described above and the exhaust gas thereoutside, in short, when a difference is generated in the oxygen concentration, the atmospheric air and the exhaust gas being separated through the detection element 18a, in order to reduce the difference, oxygen on a side with high oxygen concentration (usually, an atmosphere side) ionizes to pass through a solid electrolyte, and moves to a side with low oxygen concentration (usually, an exhaust side). Electron movement occurs at electrodes of inside and outside surfaces of the detection element 18a according to the movement of oxygen, and as a result, an electromotive force is generated in the detection element. In this way, the post-catalyst sensor 18 outputs a voltage according to the difference of the oxygen partial pressure between the atmospheric air and the exhaust gas, i.e., the difference of the oxygen concentrations.

Meanwhile, the oxygen concentration of the exhaust gas changes according to the air-fuel ratio of the burnt air-fuel mixture. For example, when an air-fuel mixture having an air-fuel ratio of the stoichiometry or richer than that is burnt, oxygen of the air-fuel mixture is almost completely burnt, and thus the oxygen concentration of the exhaust gas becomes approximately zero. In addition, when combustion is performed by an air-fuel mixture having an air-fuel ratio leaner than the stoichiometry, oxygen remains at the time of the combustion. Therefore, the leaner the air-fuel ratio becomes, the higher the oxygen concentration in the exhaust gas becomes. In contrast with this, the oxygen concentration in the atmospheric air is always substantially constant. Accordingly, an air-fuel ratio of the air-fuel mixture burnt in the engine 1 can be recognized by the output voltage of the sensor 18 according to the oxygen concentration of the exhaust gas on the basis of the oxygen concentration of the atmospheric air. This is as already explained with reference to FIG. 3.

Figure 4C:
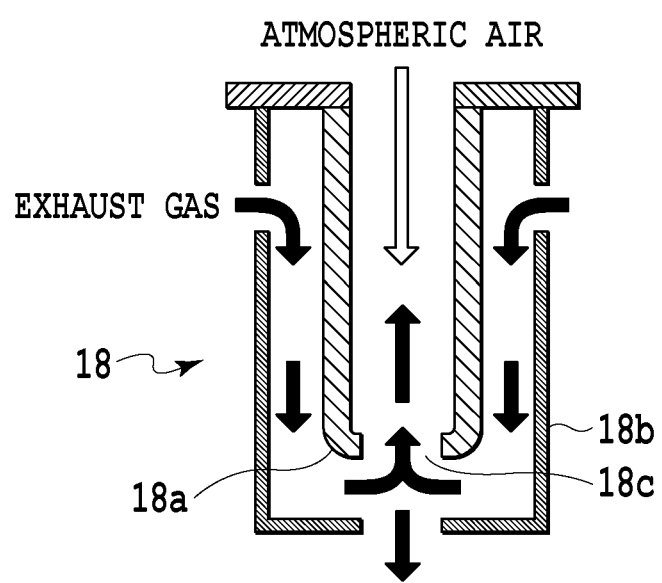
FIG. 4C is a schematic diagram representing a state where a defect occurs in a detection element of the sensor of FIG. 4A.

Now, in the post-catalyst sensor 18, which is the oxygen sensor as described above, as shown in FIG. 4C, when a defect, i.e., an element crack 18c, occurs in the detection element 18a, and an inside and an outside of the detection element 18a communicate with each other, exhaust outside the detection element enters the inside thereof. As a result of it, the difference in the oxygen concentration between inside and outside of the detection element 18a is eliminated, and the post-catalyst sensor 18 stops generating an electromotive force. That is, when such abnormality occurs in the post-catalyst sensor 18, the post-catalyst sensor 18 comes to generate an output similar to an output at the time of lean combustion. Additionally, generally, the output voltage of the post-catalyst sensor 18 becomes smaller as a degree of abnormality as described above increases in the post-catalyst sensor 18, and the post-catalyst sensor 18 generates an output in which the air-fuel ratio has been shifted particularly closer to a lean side than a predetermined value closer to the lean side than the stoichiometry with respect to the stoichiometry.

Figure 5:
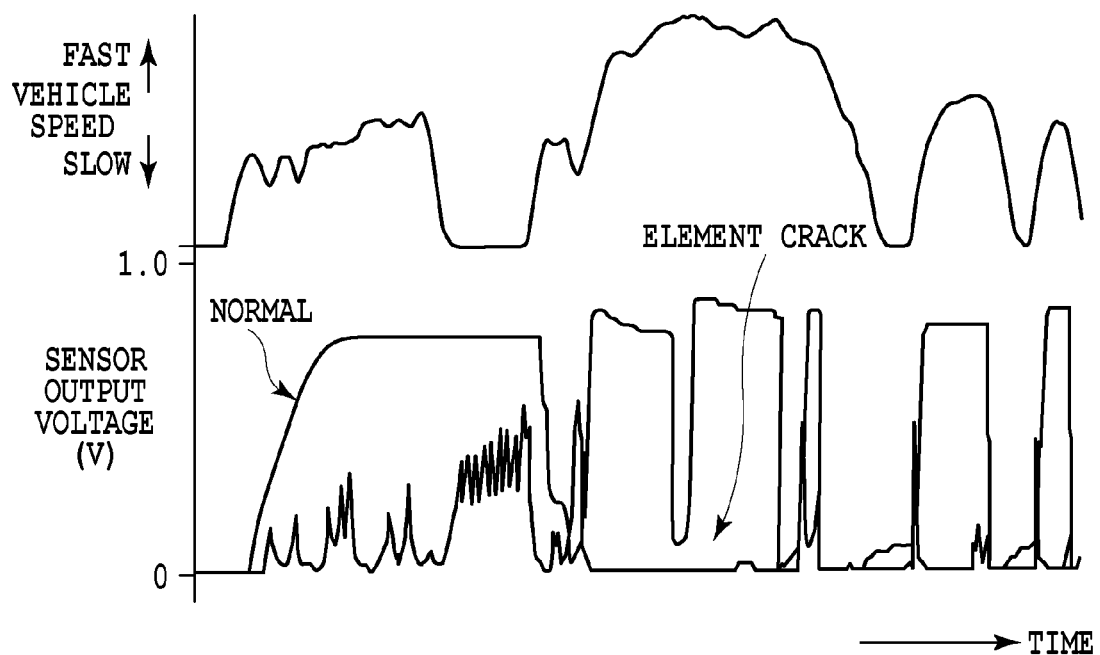
FIG. 5 is a graph showing in an overlapping manner an example of an output waveform of the oxygen sensor of FIG. 4A and an example of an output waveform of the oxygen sensor of FIG. 4C.

Here, one example of change of the output voltage of the post-catalyst sensor 18 will be represented in FIG. 5 together with a vehicle speed. As represented in FIG. 5, an output voltage from the normal post-catalyst sensor 18 changes so as to repeat a time when it is in a low voltage region lower than the stoichiometric equivalent voltage, for example, in a region not more than 0.2 V and not less than 0 V, and a time when it is in a high voltage region higher than the stoichiometric equivalent voltage, for example, in a high voltage region not less than 0.6 V and not more than 1 V. In contrast with this, an output voltage from the abnormal post-catalyst sensor 18 in which an element crack has occurred here is generally in the low voltage region lower than the stoichiometric equivalent voltage, it is in a voltage region particularly low in the low voltage region, for example, in a voltage region not more than 0.05 V (preferably, not less than 0 V), and it is hardly not less than the stoichiometric equivalent voltage.

As described above, the more the degree of abnormality of the post-catalyst sensor 18 increases, the more a tendency for the post-catalyst sensor 18 to generate the output similar to the output at the time of lean combustion increases, and for example, frequency to output a voltage not more than 0.05 V increases. That is, the degree of abnormality of the post-catalyst sensor 18 and a degree in which the output of the post-catalyst sensor 18 is shifted to the lean side have a correlation with each other.

Meanwhile, also when a degree of variation of air-fuel ratios among cylinders is high, the tendency for the post-catalyst sensor 18 to generate the output similar to the output at the time of lean combustion can be increased. This will be explained hereinafter.

For example, in a part (particularly, one cylinder) of all the cylinders, failure of the injector 5 etc. may occur, and variation (imbalance) of air-fuel ratios may occur among the cylinders. For example, the above occurs in a case where a fuel injection amount of a #1 cylinder increases more than fuel injection amounts of other #2, #3, #4 cylinders due to poor valve closing of the injector 5, and an air-fuel ratio of the #1 cylinder deviates to a rich side more largely than air-fuel ratios of the other #2, #3, #4 cylinders. Even at this time, if a comparatively large correction amount is given by the above-mentioned air-fuel ratio feedback control, a detected air-fuel ratio of total gas (merged exhaust gas) supplied to the pre-catalyst sensor 17 can be controlled to be the stoichiometry in some cases. However, looking at cylinders individually, the #1 cylinder is much richer than the stoichiometry, the #2, #3, #4 cylinders are leaner than the stoichiometry, and they are stoichiometric only as whole balance.

In addition, fuel supplied to the combustion chamber is a compound of carbon and hydrogen. Accordingly, when an air-fuel ratio of the air-fuel mixture supplied for combustion is the air-fuel ratio closer to the rich side than the stoichiometry, unburnt materials such as HC, CO and $H_2$ are generated as intermediate products. Additionally, the closer to the rich side the air-fuel ratio is, the smaller a probability of combining of those unburnt materials with oxygen, i.e., a probability of oxidation combustion of those unburnt materials, rapidly becomes. As a result of this, the closer to the rich side the air-fuel ratio is, the more an amount of those unburnt materials discharged from the combustion chamber increases. This is similar in a case where the degree of variation of the air-fuel ratios among cylinders becomes large, and the case is shown in FIG. 6.

Figure 6:
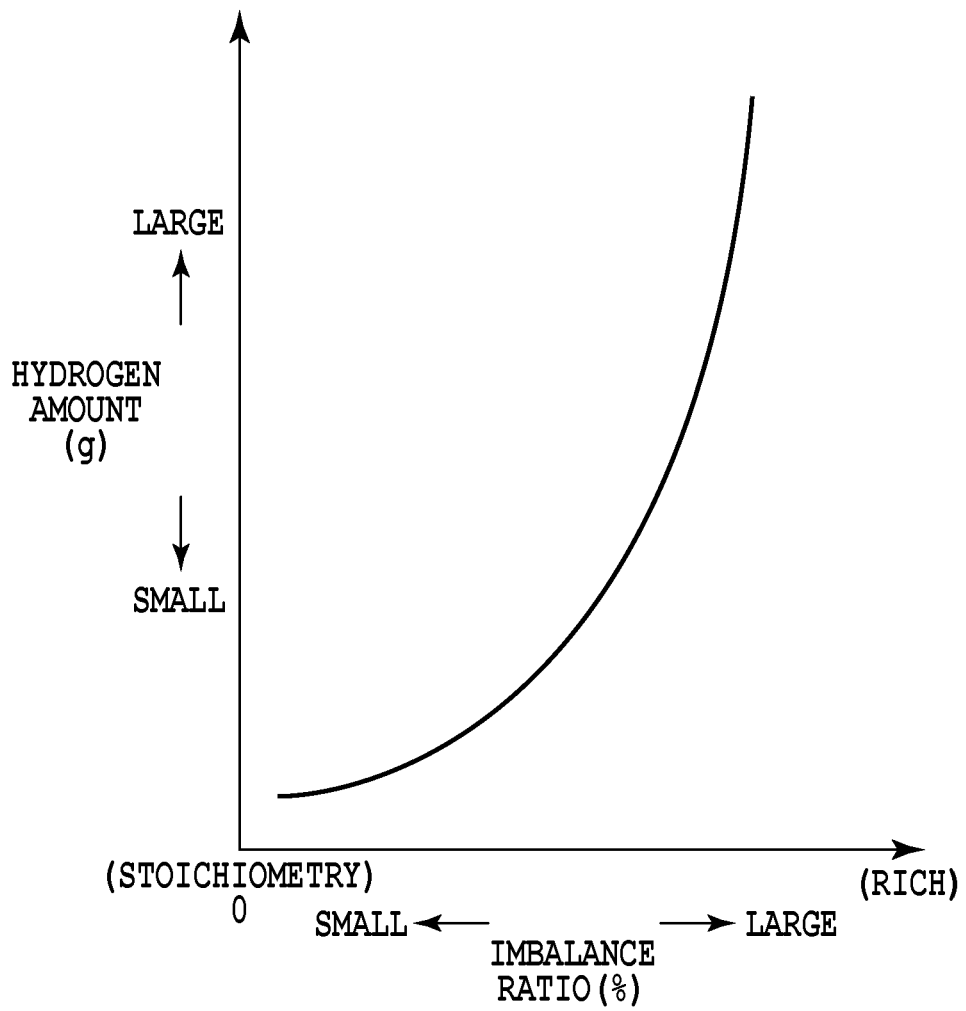
FIG. 6 is a graph showing a relation between an imbalance ratio and a hydrogen amount discharged to an exhaust passage.

FIG. 6 is a graph showing change of a discharge amount of hydrogen with respect to an air-fuel ratio or an imbalance ratio of the rich side. The imbalance ratio (%) is one parameter representing the degree of variation, i.e., a degree of imbalance of the air-fuel ratios among cylinders. Namely, the imbalance ratio is a value indicating that when deviation of fuel injection amount occurs at only one certain cylinder among all the cylinders, at what ratio a fuel injection amount of the cylinder (imbalance cylinder) in which the deviation of fuel injection amount has occurred deviates from a fuel injection amount of a cylinder (balance cylinder) in which the deviation of fuel injection amount has not occurred. Assuming that the imbalance ratio is denoted as IB, the fuel injection amount of the imbalance cylinder is denoted as Qib, and the fuel injection amount of the balance cylinder, i.e., a reference fuel injection amount, is denoted as Qs, a formula, $IB=(Qib-Qs)/Qs \times 100$, can be expressed. The larger the imbalance ratio IB or an absolute value thereof is, the larger a deviation of the fuel injection amount of the imbalance cylinder with respect to the balance cylinder is, and the larger the degree of variation of the air-fuel ratios among cylinders is. Accordingly, it turns out from FIG. 6 that the larger the degree of variation of the air-fuel ratios among cylinders becomes, the more a discharge amount of hydrogen increases.

Meanwhile, the pre-catalyst sensor 17, which is an air-fuel ratio sensor, is generally provided with a diffusion resistance layer, and generates an output according to an amount of oxygen (an oxygen concentration or an oxygen partial pressure) that has passed through the diffusion resistance layer and has reached an exhaust-side electrode layer (a detection element surface) of the pre-catalyst sensor 17. However, the output of the pre-catalyst sensor 17 is the one further also according to an amount (a concentration or a partial pressure) of the unburnt materials that have passed through the diffusion resistance layer.

Hydrogen is a smaller molecule compared with HC, CO, etc. Accordingly, hydrogen diffuses in the diffusion resistance layer of the pre-catalyst sensor 17 more easily compared with the other unburnt materials. That is, preferential diffusion of hydrogen occurs in the diffusion resistance layer.

When the degree of variation of the air-fuel ratios among cylinders becomes large, the output of the pre-catalyst sensor 17 corresponds to the air-fuel ratio closer to the rich side than a true air-fuel ratio, due to the preferential diffusion of hydrogen. Accordingly, since the air-fuel ratio closer to the rich side than the true air-fuel ratio is detected by the pre-catalyst sensor 17, larger correction to the lean side is performed by the above-described air-fuel ratio feedback control compared with a case where there is no or almost no variation of the air-fuel ratios among cylinders. Accordingly, the post-catalyst sensor 18, which is the oxygen sensor, has a stronger tendency to generate the output biased to the lean.

This tendency similarly applies to not only a case where the fuel injection amount of the imbalance cylinder is larger than the fuel injection amount of the balance cylinder, but a case where the fuel injection amount of the imbalance cylinder is smaller than the fuel injection amount of the balance cylinder. In the case where the fuel injection amount of the imbalance cylinder is smaller than the fuel injection amount of the balance cylinder, fuel injection amounts of other balance cylinders are increased by the air-fuel ratio feedback control so as to make up for a shortage of the fuel injection amount of the imbalance cylinder. Accordingly, more hydrogen is discharged from the balance cylinder compared with the case where there is no or almost no variation of the air-fuel ratios among cylinders. Due to the hydrogen, the pre-catalyst sensor 17 has a higher tendency to generate the output according to the air-fuel ratio closer to the rich side than the true air-fuel ratio. Accordingly, also in the case where the fuel injection amount of the imbalance cylinder is smaller than the fuel injection amount of the balance cylinder, similarly, as a result of the above-described air-fuel ratio feedback control being performed, the post-catalyst sensor 18, which is the oxygen sensor, has a stronger tendency to generate the output biased to the lean.

As described above, also when the degree of variation of the air-fuel ratios among cylinders is high, the post-catalyst sensor 18 can have a stronger tendency to generate the output similar to the output at the time of lean combustion.

Meanwhile, as mentioned above, when variation of the air-fuel ratios occurs among cylinders, looking at cylinders individually, for example, the air-fuel ratio of the imbalance cylinder deviates to the rich largely from the stoichiometry, and the air-fuel ratios of the other balance cylinders are leaner than the stoichiometry. Accordingly, when the variation of the air-fuel ratios occurs among cylinders, the post-catalyst sensor 18, if it is normal, has the stronger tendency to generate the output similar to the output at the time of lean combustion as mentioned above, but on the other hand, it generates an output similar to an output at the time of rich combustion.

As mentioned above, when abnormality, such as a defective abnormality, occurs in the detection element 18a of the post-catalyst sensor 18, the post-catalyst sensor 18 has the stronger tendency to generate the output similar to the output at the time of lean combustion, and it rarely generates the output similar to the output at the time of rich combustion. In contrast with this, for example, when the degree of variation of the air-fuel ratios among cylinders is high, the post-catalyst sensor 18, if it is normal, i.e., if there is no obvious abnormality, has the stronger tendency to generate the output similar to the output at the time of lean combustion, but it generates the output similar to the output at the time of rich combustion at a certain ratio. Consequently, here, output appearance tendencies (hereinafter, output tendencies) of the post-catalyst sensor 18 in a predetermined lean region closer to the lean side than the stoichiometry and in a predetermined rich region closer to the rich side than the stoichiometry are monitored, and the degree of abnormality of the post-catalyst sensor 18 is precisely estimated based on those tendencies. Additionally, when the post-catalyst sensor 18 has abnormality, a limit is set to correction to the main air-fuel ratio control based on the output of the pre-catalyst sensor 17 according to the degree of the abnormality, and excessive enriching correction is suppressed or preferably prevented. Hereinafter, the air-fuel ratio control will be specifically explained.

Figure 7:
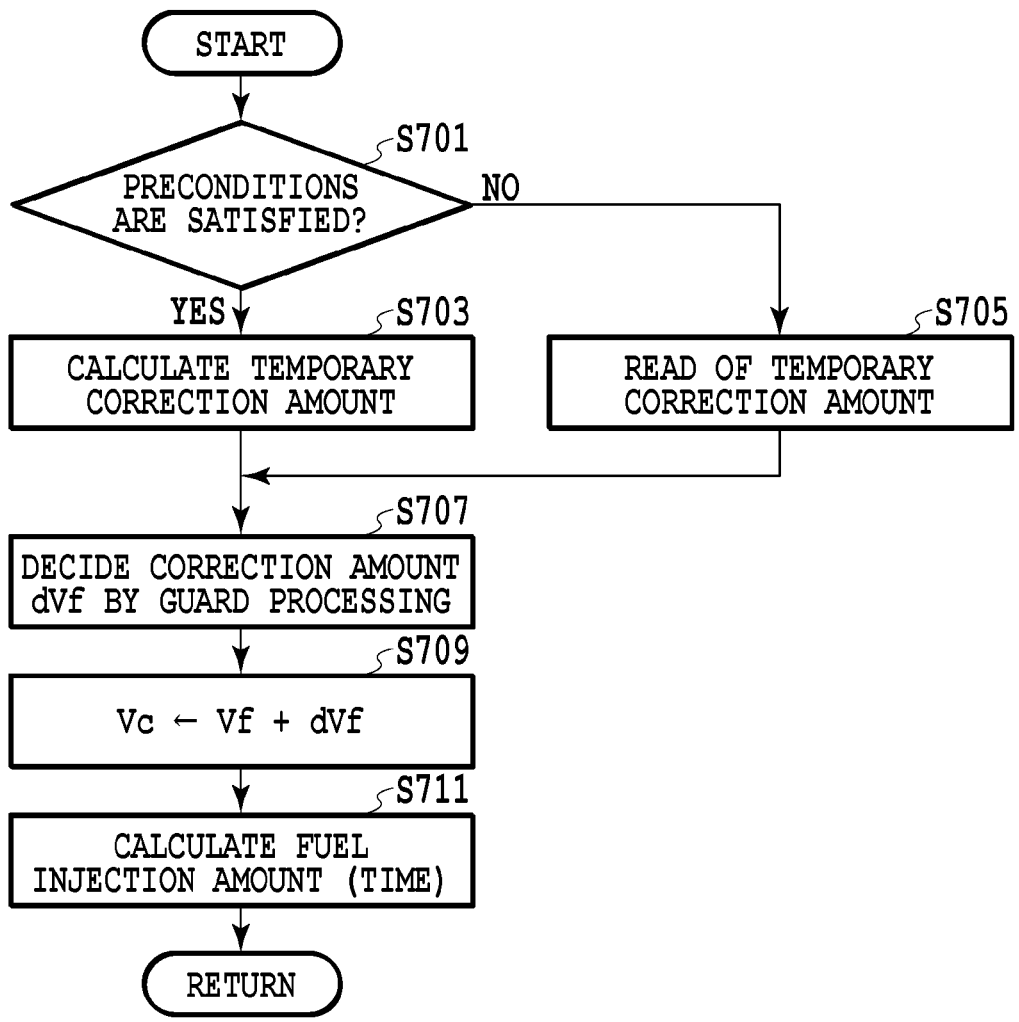
FIG. 7 is a flow chart of processing of air-fuel ratio control of the first embodiment.
Figure 8:
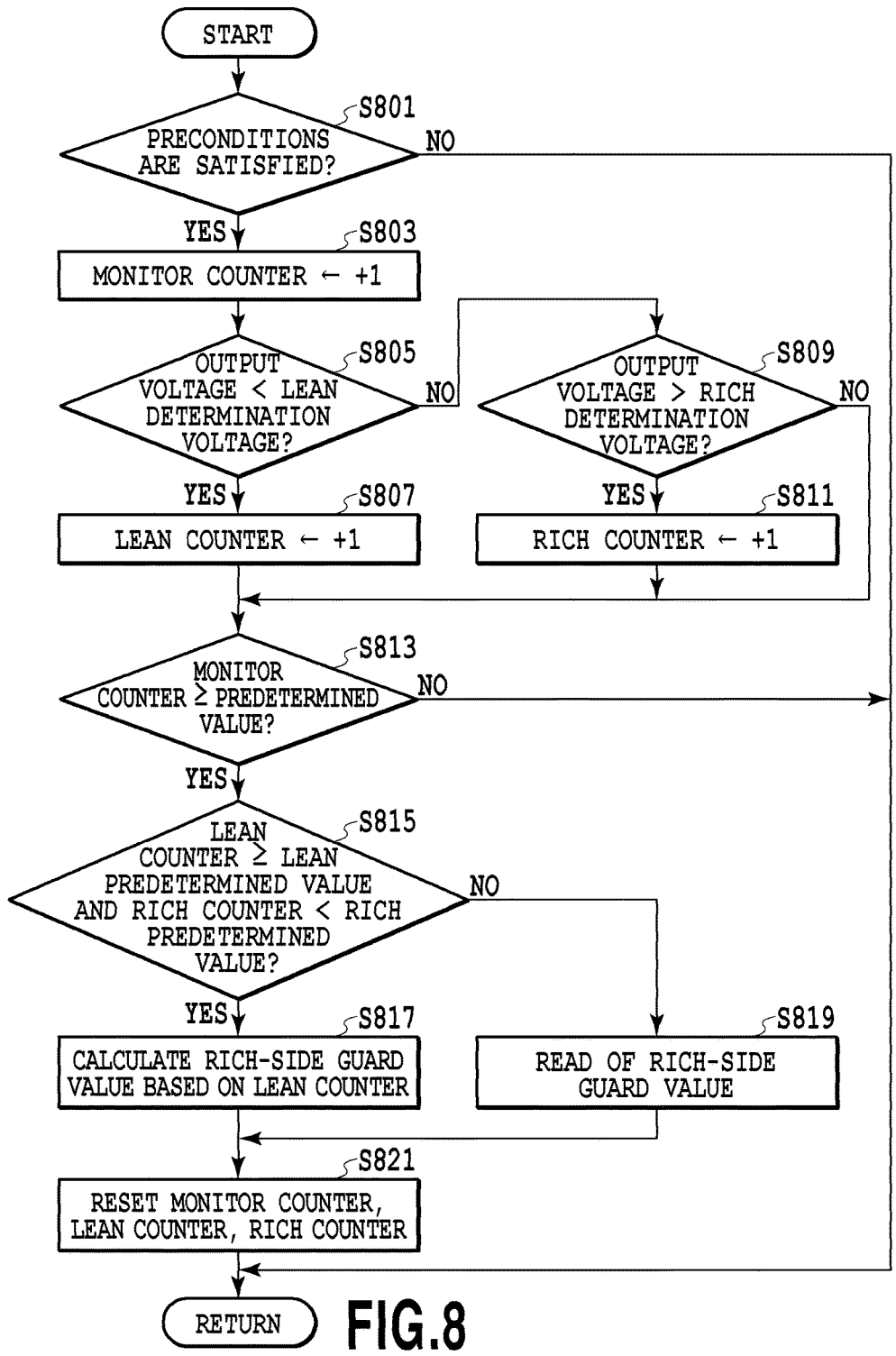
FIG. 8 is a flow chart of setting processing of a guard value of the first embodiment.

The air-fuel ratio control will be further explained based on flow charts of FIGS. 7 and 8. Note that processing based on a flow of FIG. 7 is repeatedly executed by the ECU 20 during engine operation, and that specifically, it is repeatedly executed for each certain rotation of a crankshaft. In addition, processing based on a flow of FIG. 8 is also repeatedly executed by the ECU 20 during the engine operation.

When air-fuel ratio control processing is started, it is first determined in step S701 whether or not conditions (hereinafter, correction preconditions) with which correction of main air-fuel ratio control by the post-catalyst sensor 18, which is the oxygen sensor, should be performed are satisfied. The correction preconditions are, for example, as follows: an engine cooling water temperature is not less than a prescribed value; start of the engine 1 is completed; fuel increase, such as after-start increase, warming-up increase, power increase, and OTP increase for catalyst overheat prevention, is not being executed, and a prescribed time has elapsed after end of such increase; fuel cut is not being executed, and a prescribed time has elapsed after end of the fuel cut; and the output of the post-catalyst sensor 18 was inverted (changed from a lean output to a rich output, or changed oppositely thereto, i.e., it was determined that the post-catalyst sensor 18 was activated) at least once after the start of the engine 1. When all of them are then satisfied, it is determined that the correction preconditions are satisfied.

When affirmative determination is performed since the correction preconditions are satisfied in step S701, a temporary correction amount dVft is calculated based on the output of the post-catalyst sensor 18 in next step S703. This temporary correction amount can be calculated using known various techniques or operation methods. Here, one example thereof is shown.

First, a deviation $\Delta Vr$ is calculated from a difference between the reference voltage Vrefr and the acquired output voltage Vr of the post-catalyst sensor 18 ($\Delta Vr \leftarrow Vrefr-Vr$). Next, an integrated value SUM and an average integrated value ASUM are calculated based on the deviation $\Delta Vr$. The integrated value SUM is calculated by adding the deviation $\Delta Vr$ to an integrated value SUM, which is the value at the time of last calculation ($SUM \leftarrow SUM+\Delta Vr$). The average integrated value ASUM indicates an average value in which fluctuation of the integrated value SUM in a short period is suppressed, and is obtained as a weighted average value of the integrated value SUM using the average integrated value ASUM, which is the value at the time of the last calculation ($ASUM \leftarrow \{(n-1)*ASUM+SUM\}/n$, however, for example, n is set to be not less than 1). Note that processing other than the weighted average value may be employed, and that the average integrated value ASUM may just be obtained as the average value in which fluctuation of the integrated value SUM is reduced. Note that the integrated value SUM and the average integrated value ASUM are set to be zero in the initial state, respectively.

When the integrated value SUM and the average integrated value ASUM are calculated, next, a change amount $d\Delta Vr$ of the output deviation $\Delta Vr$ of the post-catalyst sensor 18 is calculated with respect to the output deviation $\Delta Vr$ ($=\Delta Vrold$) at the time of the last calculation ($d\Delta Vr \leftarrow \Delta Vr - \Delta Vrold$). The temporary correction amount dVft for correcting the output voltage Vf of the pre-catalyst sensor 17 is then calculated based on Formula (1) using those calculated values.

$$dVft \leftarrow -KP*\Delta Vr + KI*SUM + KD*d\Delta Vr \qquad (1)$$

However, respective coefficients KP, KI, KD are values previously set by an experiment.

Meanwhile, when negative determination is performed in step S701 since the correction preconditions are not satisfied, in step S705, a value calculated by multiplying a latest average integrated value ASUM calculated when the previous correction preconditions are satisfied by the predetermined coefficient KI is read as the temporary correction amount dVft (dVft←−KI*ASUM). Note that when step S705 is reached, the latest average integrated value ASUM calculated when the previous correction preconditions are satisfied may be read, it may be multiplied by the predetermined coefficient KI, and the temporary correction amount $d\Delta Vft$ may be calculated.

When the temporary correction amount $d\Delta Vft$ is obtained in step S703 or S705, in step S707, guard processing is applied to the temporary correction amount $d\Delta Vft$, and the correction amount dVf for correcting the output voltage Vf of the pre-catalyst sensor 17 is calculated. The guard processing is executed based on a guard value determined according to the flow chart of FIG. 8. Note that as is apparent from the following explanation, this guard value is determined to set a limit to the temporary correction amount, which is a correction amount set based on the output of the post-catalyst sensor 18, with respect to the above-described main air-fuel ratio control.

Here, setting processing of the guard value will be explained according to the flow chart of FIG. 8.

First, in step S801, it is determined whether or not preconditions (hereinafter, abnormality preconditions) for setting the guard value according to the degree of abnormality of the pre-catalyst sensor 18 are satisfied. Here, the abnormality preconditions are conditions for determining whether or not the internal combustion engine is in a state where an output abnormality of the post-catalyst sensor 18 itself can be determined based on the output of the post-catalyst sensor 18. Here, satisfying all the following conditions is set as the abnormality preconditions: activation of the post-catalyst sensor 18 is completed; a prescribed time has elapsed after returning from fuel cut; an intake air amount is not less than a prescribed value; and the state is not an idle state. However, the abnormality preconditions may be preconditions other than these. Note that, elapse of the prescribed time after returning from fuel cut is included in the abnormality preconditions because the internal combustion engine waits until an effect by the fuel cut is eliminated after returning from the fuel cut. In addition, the conditions that the intake air amount is not less than the prescribed value and the state is not an idle state are included in the abnormality preconditions because a back pressure of the exhaust gas is sufficiently increased in order to make an element crack clearly appear in the output when the detection element of the post-catalyst sensor 18 has a defective abnormality, i.e., the element crack has occurred.

When affirmative determination is performed since the abnormality preconditions are satisfied in step S801, a monitor counter is added by one in step S803. The monitor counter is set to be zero in its initial state. Note that when negative determination is performed in step S801, the routine ends.

In step S805 next to step S803, it is determined whether or not an output voltage of the post-catalyst sensor 18 acquired in this routine is less than a lean determination voltage. The lean determination voltage is set as a rich-side boundary value of a voltage region closer to the lean side than the stoichiometry, the voltage region more including the output generated by the post-catalyst sensor 18, as the degree of abnormality of the post-catalyst sensor 18 more increases, and particularly the degree of the defect abnormality more increases. Note that the voltage region is the region not less than 0 V and less than the lean determination voltage, and corresponds to a predetermined lean region of the present invention. Here, although the lean determination voltage is set to be 0.05 V, it may be a value other than this. Additionally, when affirmative determination is performed in step S805, a lean counter is increased by one in step S807. The lean counter is set to be zero in its initial state.

In contrast with this, when negative determination is performed since the output voltage of the post-catalyst sensor 18 is not less than the lean determination voltage in step S805, it is determined whether or not the output voltage of the post-catalyst sensor 18 exceeds a rich determination voltage in step S809. The rich determination voltage is set as a lean-side boundary value of a voltage region closer to the rich side than the stoichiometry, the voltage region less including the output generated by the post-catalyst sensor 18, as the degree of abnormality of the post-catalyst sensor 18 more increases. Note that the voltage region is the region not more than 1 V and exceeding the rich determination voltage, and corresponds to a predetermined rich region of the present invention. Here, although the rich determination voltage is set to be 0.70 V, it may be a value other than this. Additionally, when affirmative determination is performed in step S809, a rich counter is increased by one in step S811. The rich counter is set to be zero in its initial state. Note that in steps S805 and S809, a value of the air-fuel ratio corresponding to the voltage value may be used instead of the voltage value.

Figure 9:
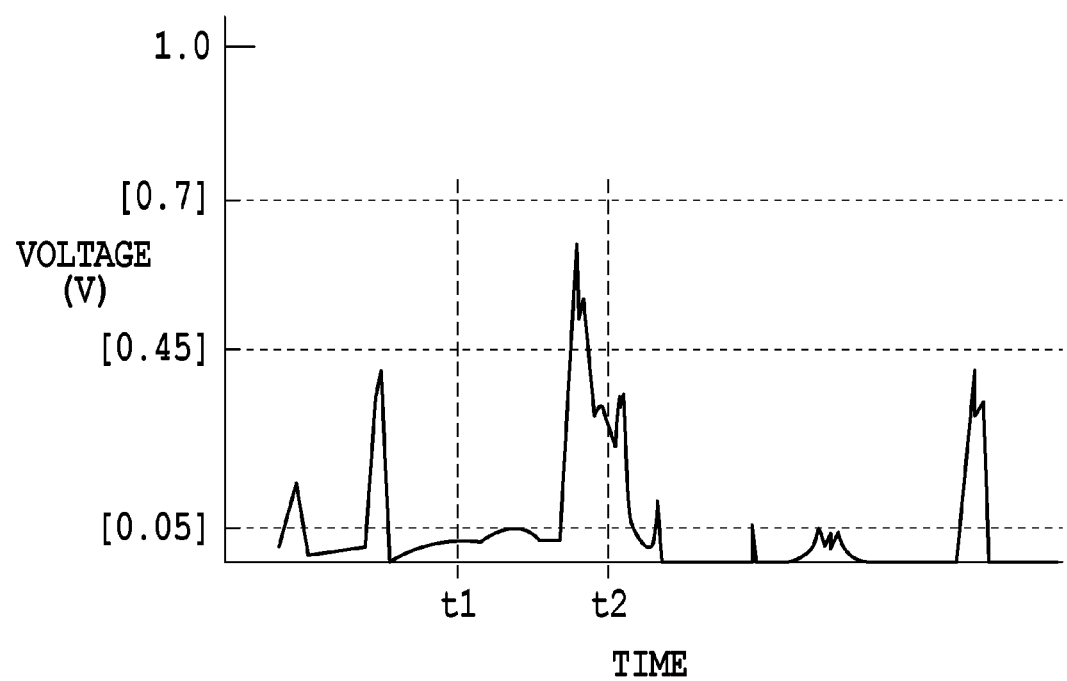
FIG. 9 is a graph showing an example of change of an output of the post-catalyst sensor when the detection element of the post-catalyst sensor has a defective abnormality.

Here, steps S805 to S811 will be further explained using a case shown in FIG. 9 as an example. FIG. 9 shows an example of change of an output voltage when an obvious defective abnormality occurs in the post-catalyst sensor 18. Generally, although an output of the post-catalyst sensor 18 is less than 0.05 V, it sometimes becomes high like indicating a peak. Such a phenomenon, for example, may occur along with fuel cut being performed.

For example, since an output of the post-catalyst sensor 18 acquired at timing t1 of FIG. 9 is less than 0.05 V, affirmative determination is performed in step S805, and the lean counter is increased by one in step S807. In addition, since an output of the post-catalyst sensor 18 acquired at timing t2 of FIG. 9 is not less than 0.05 V and not more than 0.7 V, negative determination is performed in steps S805 and S809, and neither the lean counter nor the rich counter is increased.

In this way, when the lean counter is increased by one in step S807, the rich counter is increased by one in step S811, or negative determination is performed in step S809, it is determined in step S813 whether or not a value of the monitor counter is not less than a predetermined value. This determination corresponds to determination of whether or not a monitoring time set to more appropriately estimate the degree of abnormality of the post-catalyst sensor 18 has elapsed. For example, the monitoring time is several tens of seconds.

When negative determination is performed since the value of the monitor counter is less than the predetermined value in step S813, the routine is ended. In contrast with this, when affirmative determination is performed in step S813 since the value of the monitor counter is not less than the predetermined value, it is determined in step S815 whether or not a value of the lean counter is not less than the lean predetermined value, and a value of the rich counter is less than the rich predetermined value.

In step S815, the value of the lean counter is used as a lean tendency value representing an output tendency in the predetermined lean region in the monitoring time, which is the predetermined time, and the value of the rich counter is used as a rich tendency value representing an output tendency in the predetermined rich region in the monitoring time, which is the predetermined time. Additionally, determining whether or not the value of the lean counter is not less than the lean predetermined value corresponds to determining whether or not a degree of the output tendency in the predetermined lean region is not less than a predetermined lean degree, and determining whether or not the value of the rich counter is less than the rich predetermined value corresponds to determining whether or not a degree of the output tendency in the predetermined rich region is less than a predetermined rich degree.

Figure 10:
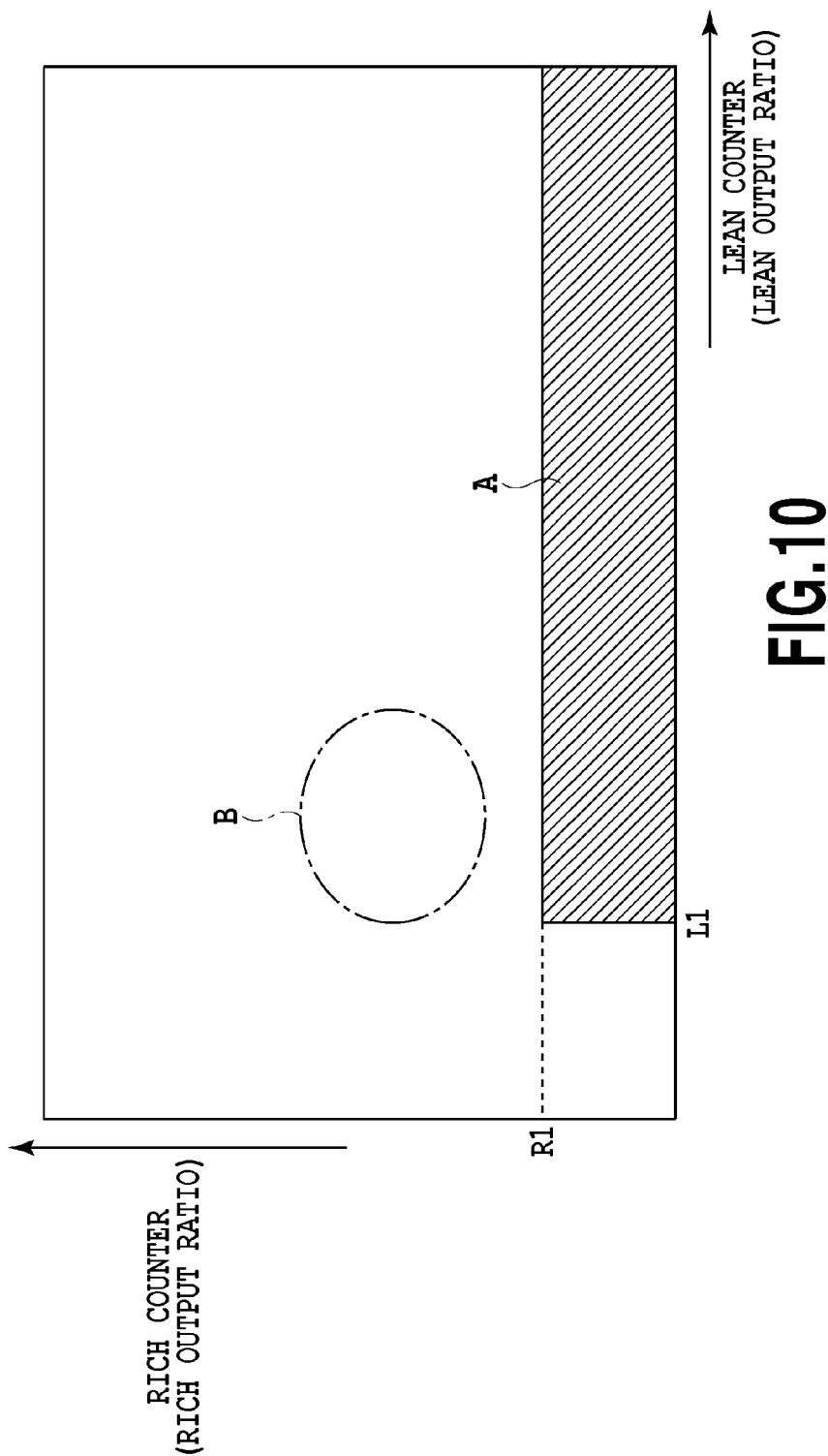
FIG. 10 is a diagram showing a region where a limit according to a degree of abnormality of the post-catalyst sensor is set to correction to main air-fuel ratio control.

Here, a region A where affirmative determination is performed in step S815 with respect to the lean counter and the rich counter is shown in FIG. 10. The region A is defined by a lean predetermined value L1 and a rich predetermined value R1. In a case shown in FIG. 9, as mentioned above, the lean counter and the rich counter are counted, respectively, one plot (not shown) located in the region A of FIG. 10 is obtained, and affirmative determination is performed in step S815. Note that when the degree of variation of the air-fuel ratios among cylinders is large, and there is no abnormality in the post-catalyst sensor 18, for example, one plot located in a region B of FIG. 10 is obtained, and negative determination is performed in step S815.

Note that in step S815, a lean output ratio (a unit: %) (lean output ratio=value of lean counter/predetermined value of step S813×100) can be used as the lean tendency value instead of the value of the lean counter, and that a rich output ratio (a unit: %) (rich ratio=value of rich counter/predetermined value of step S813×100) can also be used as the rich tendency value instead of the value of the rich counter. In this case, a step of calculating these lean output ratio and rich output ratio is provided between steps S813 and S815, and the lean predetermined value and the rich predetermined value in step S815 become values corresponding to these. FIG. 10 can also be understood that the region A is represented to the lean output ratio and the rich output ratio, and the lean predetermined value L1, for example, can be 5 to 10%.

When affirmative determination is performed in step S815, a rich-side guard value dVgrd (+) is calculated based on the lean counter in step S817. Since step S817 is reached when the post-catalyst sensor 18 has abnormality as mentioned above, and in this case, the post-catalyst sensor 18 has the strong tendency to generate the output similar to the output at the time of lean combustion, correction to enrich the air-fuel ratio is promoted when air-fuel ratio control is performed using the output as it is. Consequently, here, the rich-side guard value dVgrd (+) is changed from an initial value and set in a direction to suppress enriching of the air-fuel ratio. That is, step S817 is reached, and thereby change of the previously set rich-side guard value dVgrd (+) is permitted.

In contrast with this, when negative determination is performed in step S815, a rich-side guard value for a normal time that is set in an initial state is read and set in step S819. When step S819 is reached, the post-catalyst sensor 18 is normal or substantially normal. That is, step S819 is reached, and thereby change of the previously set rich-side guard value dVgrd (+) is forbidden.

When step S817 or S819 is gone through, step S821 is reached, and the monitor counter, the lean counter, and the rich counter are reset. That is, these counters are set to be zero. Consequently, the routine ends.

Figure 11:
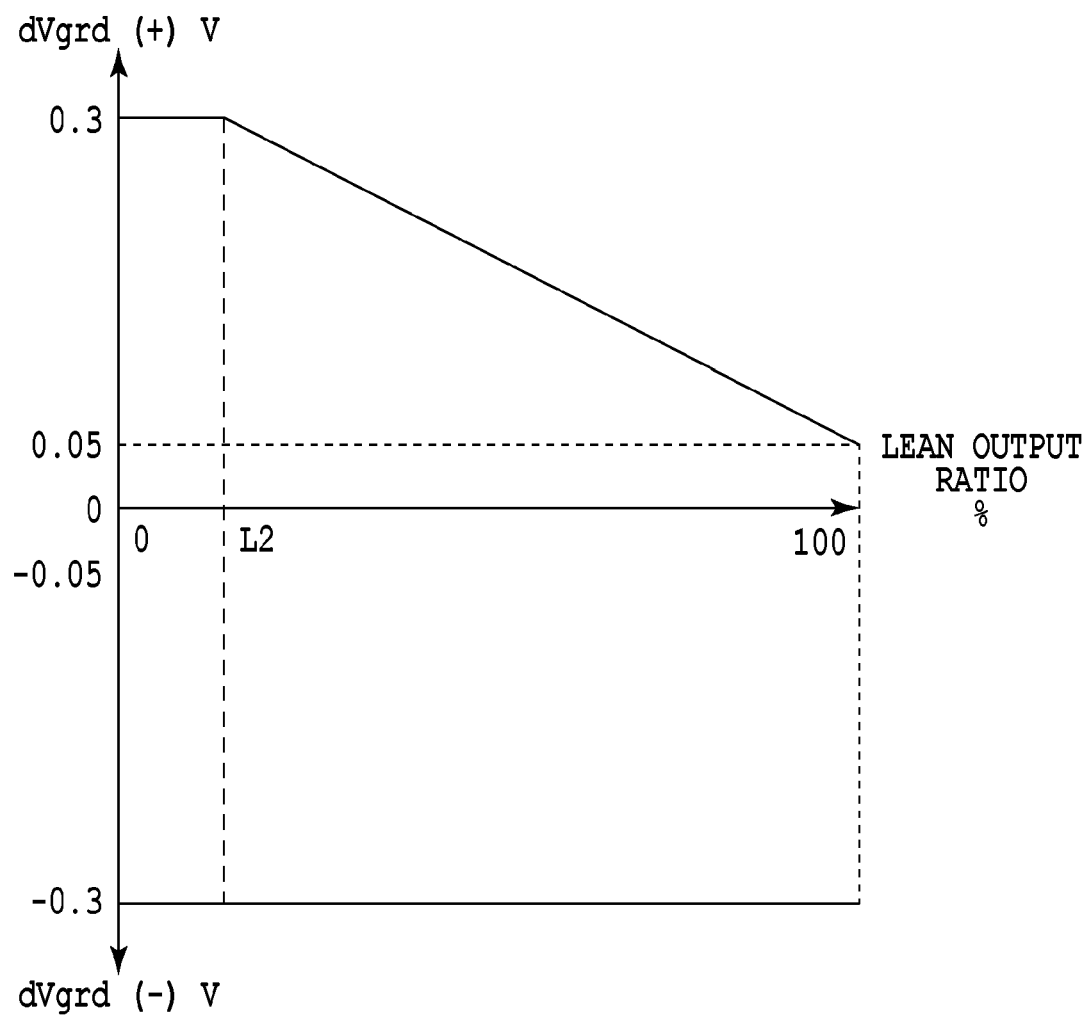
FIG. 11 is a graph showing change of a guard value to a lean output ratio.

Here, setting of the rich-side guard value dVgrd (+) will be further explained based on FIG. 11. However, a value of FIG. 11 relates to a case where the temporary correction amount dΔVft is calculated in the air-fuel ratio control as mentioned in detail above.

FIG. 11 represents change of the guard value dVgrd based on the lean output ratio (a lean ratio). Guard values include the rich-side guard value dVgrd (+) and a lean-side guard value dVgrd (−). A ratio L2 of FIG. 11 corresponds to the lean predetermined value L1 of FIG. 10, and they are the same or substantially the same. In the embodiment, 0.3 V is set as the rich-side guard value dVgrd (+) in an initial state, and −0.3 V is set as the lean-side guard value dVgrd (−) in the initial state.

When in step S815, affirmative determination is performed since the value of the lean counter is not less than the lean predetermined value, and the value of the rich counter is less than the rich predetermined value, the rich-side guard value dVgrd (+) is changed from an initial value (0.3 V) based on data as represented in FIG. 11 or an operation formula corresponding to the data. Specifically, first, the value of the lean counter obtained so far is divided by the predetermined value of step S813, the divided value is multiplied by 100, and thereby the lean output ratio can be obtained. Additionally, the data as represented in FIG. 11 is retrieved by this lean output ratio, or operation is performed based on the operation formula corresponding to the data, and thereby the rich-side guard value dVgrd (+) is calculated (step S817). Note that the data of FIG. 11 is determined so that the rich-side guard value is changed and set in the direction to more suppress enriching of the air-fuel ratio in the air-fuel ratio control as the lean output ratio is larger, i.e., as a degree is larger in which the output of the post-catalyst sensor 18, which is the oxygen sensor, is shifted to the lean side. In other words, the data of FIG. 11 is determined so that the rich-side guard value is changed and set in the direction to more suppress enriching of the air-fuel ratio in the air-fuel ratio control as a degree is larger in which appearance frequency distribution of the output value of the post-catalyst sensor 18 is shifted from the stoichiometry to the lean side to a certain degree or more.

In contrast with this, when in step S815, negative determination is performed since a requirement that the value of the lean counter is not less than the lean predetermined value, and that the value of the rich counter is less than the rich predetermined value is not satisfied, change of the rich-side guard value dVgrd (+) is forbidden as mentioned above, and the initial value (0.3 V) is set as the rich-side guard value dVgrd (+) (step S819).

Note that as is apparent from FIG. 11, the lean-side guard value dVgrd (−) is set to be an initial value regardless of the lean output ratio, i.e., regardless of the degree of abnormality of the pre-catalyst sensor 18. This is because when there is abnormality, such as a defect abnormality, in the pre-catalyst sensor 18, the output thereof generally becomes small as mentioned above.

Now, guard processing is applied to the above-mentioned temporary correction amount based on the guard value set as described above. Returning to FIG. 7, when the temporary correction amount dΔVft is obtained in step S703 or S705, and step S707 is reached, guard processing is applied to the temporary correction amount dΔVft, and the correction amount dVf for correcting the output voltage Vf of the pre-catalyst sensor 17 is calculated and decided. The guard processing is performed using either the rich-side guard value dVgrd (+) or the lean-side guard value dVgrd (−) according to whether the temporary correction amount is positive or else (or negative or else).

When the calculated temporary correction amount dΔVft is positive, in that case, it is determined whether or not the temporary correction amount dVft is larger than the rich-side guard value dVgrd (+) set at that time. Then, when the temporary correction amount dVft is larger than the rich-side guard value dVgrd (+), the rich-side guard value dVgrd (+) is calculated and set as the correction amount dVf for correcting the output voltage Vf of the pre-catalyst sensor 17. In contrast with this, if the temporary correction amount dVft is not more than the rich-side guard value dVgrd (+), the temporary correction amount dVft is set as the correction amount dVf as it is.

Meanwhile, if the calculated temporary correction amount dΔVft is not positive, in that case, it is determined whether or not the temporary correction amount dVft is smaller than the lean-side guard value dVgrd (−) set at that time. Then, when the temporary correction amount dVft is smaller than the lean-side guard value dVgrd (−), the lean-side guard value dVgrd (−) is calculated and set as the correction amount dVf for correcting the output voltage Vf of the pre-catalyst sensor 17. In contrast with this, when the temporary correction amount dVft is not less than the lean-side guard value dVgrd (−), the temporary correction amount dVft is set as the correction amount dVf as it is.

As described above, by applying the guard processing, the correction amount dVf for correcting the output voltage Vf of the pre-catalyst sensor 17 is set within the guard value dVgrd (dVgrd(−)≤dVf≤dVgrd(+)). In a manner as described above, the limit is set to the above-described correction based on the output of the post-catalyst sensor 18 with respect to the air-fuel ratio control.

Additionally, when the correction amount dVf for correcting the output voltage Vf of the pre-catalyst sensor 17 is decided in step S707, in step S709, the output voltage Vf of the pre-catalyst sensor 17 is corrected using the correction amount dVf, and a control voltage value Vc is calculated. Here, the control voltage value Vc is calculated by adding the correction amount dVf to the output voltage Vf of the pre-catalyst sensor 17 (Vc←Vf+dVf). As mentioned above, when the defective abnormality occurs in the post-catalyst sensor 18, the output of the post-catalyst sensor 18 is generally smaller compared with the reference voltage Vrefr. The control voltage value Vc calculated in such a time is generally larger than the output voltage Vf of the pre-catalyst sensor 17.

Additionally, in step S711, a fuel injection amount with which a target air-fuel ratio is achieved with respect to the intake air amount detected based on the output of the air flow meter 10, i.e., a fuel injection time, is calculated by feedback operation based on the calculated control voltage value Vc. As a result of this, the air-fuel ratio of the air-fuel mixture is feedback controlled.

As mentioned above, first, values representing the output tendencies in the predetermined lean region and the predetermined rich region in the predetermined time, specifically, the above-described value of the lean counter (or the lean output ratio) and value of the rich counter (or the rich output ratio) are calculated, and the degree of abnormality of the post-catalyst sensor 18 is estimated based on them. Then, when it is determined that the degree of abnormality of the post-catalyst sensor 18 is not less than a certain degree (affirmative determination in step S815), the limit is set to the correction to the air-fuel ratio control in the direction to more suppress enriching of the air-fuel ratio as the degree is larger in which the output of the post-catalyst sensor 18 is shifted to the lean side according to the degree of abnormality of the post-catalyst sensor 18, specifically, based on the lean output ratio. That is, when affirmative determination is performed in step S815, a stronger limit is set to the correction to the air-fuel ratio control in the direction to more suppress enriching of the air-fuel ratio as a degree is larger in which output frequency distribution of the output value of the post-catalyst sensor 18 is deviated from the stoichiometry to the lean side to a certain degree or more based on the lean output ratio. Accordingly, if the degree of variation of the air-fuel ratios among cylinders is large, and the post-catalyst sensor 18 is normal, it can be suppressed for the post-catalyst sensor 18 to be erroneously determined to have abnormality, and the air-fuel ratio can be more suitably made to follow the target air-fuel ratio by the above-described air-fuel ratio control.

Note that in the first embodiment, when in step S815, negative determination is performed since a requirement that the value of the lean counter is not less than the lean predetermined value, and that the value of the rich counter is less than the rich predetermined value is not satisfied, in step S819, change of the rich-side guard value dVgrd (+) is forbidden, and the initial value is set as the rich-side guard value dVgrd (+). However, when negative determination is performed in step S815, it is also possible that setting of the guard value is not performed at all, and that a guard processing step of the above-described step S707 is skipped or substantially skipped. In this case, the temporary correction amount calculated in step S703 or S705 can be used as the correction amount dVf as it is.

Next, a second embodiment according to the present invention will be explained. Since a configuration of an engine to which the second embodiment has been applied is almost the same as the above-described engine 1, an explanation thereof will be omitted. Note that hereinafter, a different point in the second embodiment from the first embodiment will be mainly explained.

Generally, an output characteristic of an oxygen sensor, i.e., an output characteristic of a rich side, is dependent on a temperature of a detection element of the oxygen sensor. Consequently, in the second embodiment, an output tendency of the post-catalyst sensor 18 is examined based on the output of the post-catalyst sensor 18 when the post-catalyst sensor 18 has a temperature at which a sufficient output can be generated with respect to the exhaust gas at the time of rich combustion in a case where the detection element of the post-catalyst sensor 18 is normal. Specifically, in the second embodiment, a condition that "the temperature of the detection element of the post-catalyst sensor 18 is not more than a predetermined temperature" is added to the abnormality preconditions of step S801. Additionally, for that reason, the ECU 20 also performs a function as temperature detection means (a temperature detection unit) for detecting (estimating) the temperature (element temperature) of the detection element of the post-catalyst sensor 18, which is the oxygen sensor.

The post-catalyst sensor 18, although not illustrated, includes a heater (heating means (a heating device)). The ECU 20 monitors switching timing of ON/OFF of the heater and an ON time thereof, and monitors the output of the air flow meter 10 or an intake air amount (or an exhaust flow rate) based thereon. The ECU 20 then retrieves the data previously set based on the experiment or performs operation previously set similarly based on the monitored values, and thereby detects the temperature of the detection element of the post-catalyst sensor 18. Note that outputs of further various sensors can be used in order to obtain the temperature of the detection element of the post-catalyst sensor 18. For example, the ECU 20 may obtain the temperature of the detection element of the post-catalyst sensor 18 further based on an output of the accelerator opening degree sensor 22 in addition to a monitor result of the switching timing of ON/OFF of the heater and the ON time thereof, and the output of the air flow meter 10.

Figure 12:
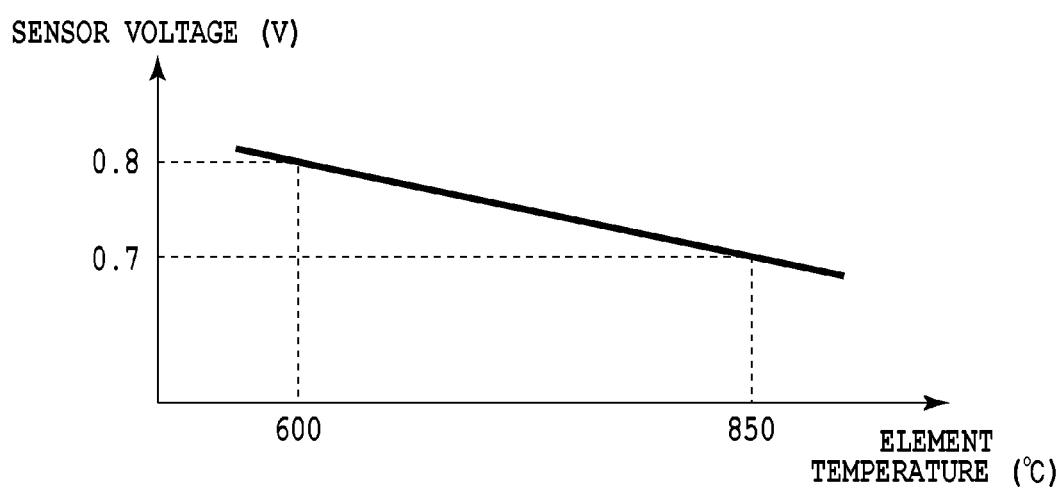
FIG. 12 is a graph showing an example of a relation between a temperature of the detection element of the post-catalyst sensor and an output voltage of the sensor.

There is shown in FIG. 12 a relation between the element temperature of the post-catalyst sensor 18 and a sensor output voltage (guaranteed value) of the post-catalyst sensor 18 at the time of rich combustion. As shown in FIG. 12, the post-catalyst sensor 18 has a characteristic in which the output of the post-catalyst sensor 18 at the time of rich combustion more lowers as the element temperature of the post-catalyst sensor 18 becomes higher. Meanwhile, in the second embodiment, the rich determination value in step S809 is 0.7 V similarly to the first embodiment in setting processing of the guard value of the air-fuel ratio control. An output of 0.7 V corresponds to 850° C. in FIG. 12. For that reason, the predetermined temperature of the condition that "the temperature of the detection element of the post-catalyst sensor 18 is not more than the predetermined temperature", which is further added to the abnormality preconditions of step S801, is set to be 850° C., which is the temperature having a correspondence relation with the rich determination value of step S809. However, the predetermined temperature, in this case, may be another temperature less than 850° C.

As mentioned above, in the second embodiment, in step S801 in the setting processing of the guard value of the air-fuel ratio control, affirmative determination is performed when the conditions are satisfied in which the detected temperature of the detection element of the post-catalyst sensor 18 is not more than 850° C. in addition to satisfaction of all the conditions: activation of the post-catalyst sensor 18 is completed; the prescribed time has elapsed after returning from fuel cut; the intake air amount is not less than the prescribed value; and the state is not the idle state. Conversely, when at least one of those conditions is not satisfied, negative determination is performed in step S801. Note that since operation processing or control other than these in the second embodiment is the same as the one explained in the first embodiment, an explanation thereof is omitted.

As described above, since the temperature of the detection element of the post-catalyst sensor 18 is also taken into consideration in the second embodiment, the rich counter can be updated more appropriately in step S811. Accordingly, the degree of abnormality of the post-catalyst sensor 18 can be evaluated more appropriately.

Note that although the temperature of the detection element of the post-catalyst sensor 18 is taken into consideration for updating, i.e., counting, of the rich counter as described above, the temperature of the detection element of the post-catalyst sensor 18 need not be taken into consideration for updating of the lean counter. However, preferably, the temperature of the detection element of the post-catalyst sensor 18 is taken into consideration for updating both the rich counter and the lean counter as in the second embodiment.

Figure 13:
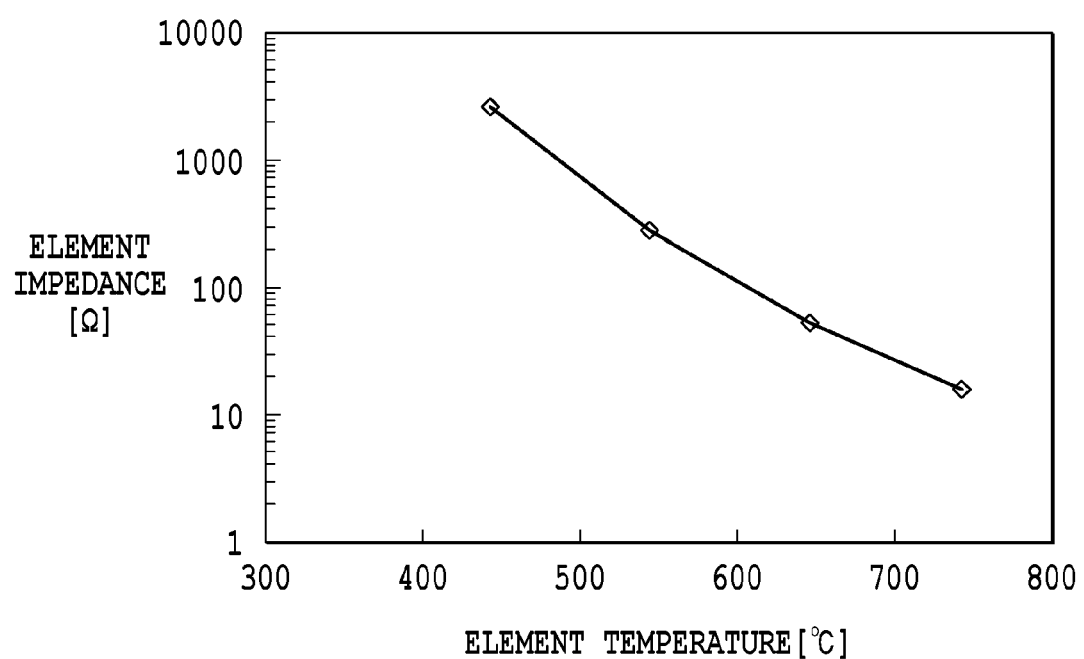
FIG. 13 is a graph showing an example of a relation between the temperature of the detection element of the post-catalyst sensor and an impedance resistance of the detection element of the sensor.

Note that detection of the temperature of the detection element of the post-catalyst sensor 18 may be made by a method other than the above. For example, the ECU 20 can have a function (i.e., a circuit) to regularly forcibly apply a voltage to the post-catalyst sensor 18, detect a current value in the detection element at that time, and calculate a resistance value (element impedance) based on the detected current value. In this case, the element temperature of the post-catalyst sensor 18 is calculated by retrieving data as represented in FIG. 13 or performing operation based on the data. Note that there is shown a relation in FIG. 13 in which the element impedance more lowers as the element temperature becomes higher.

Next, a third embodiment according to the present invention will be explained. Since a configuration of an engine to which the third embodiment has been applied is almost the same as the above-described engine 1, an explanation thereof will be omitted. Note that hereinafter, a different point in the third embodiment from the second embodiment will be mainly explained.

In the second embodiment, the rich determination value in step S809 in the setting processing of the guard value of the air-fuel ratio control is fixed to be 0.7 V. However, the rich determination value is made variable in the third embodiment.

Figure 14:
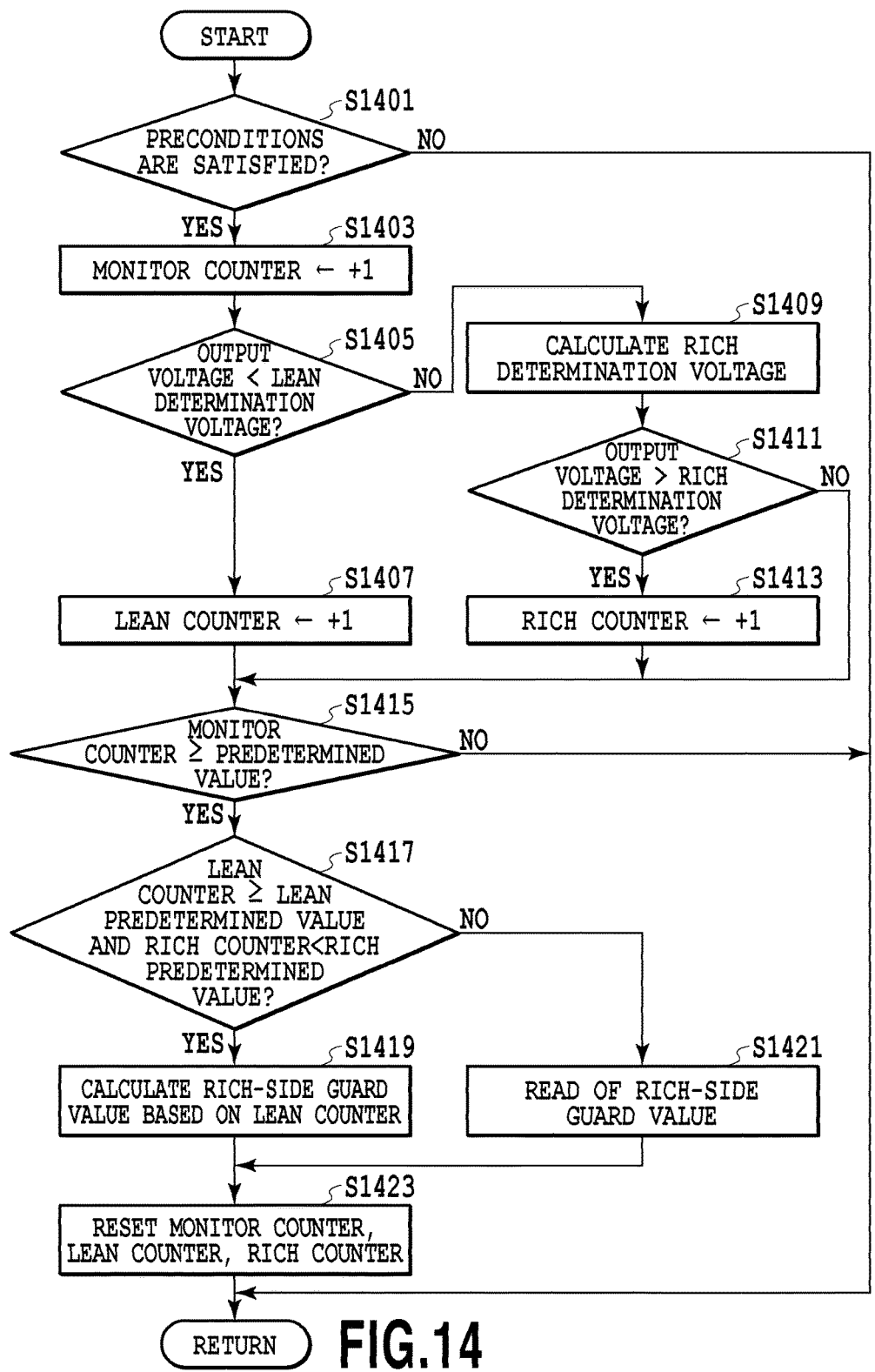
FIG. 14 is a flow chart of setting processing of a guard value of a third embodiment.

Setting processing of a guard value of air-fuel ratio control of the third embodiment will be explained based on FIG. 14. However, since steps S1401 to S1407 and S1411 to S1423 correspond to steps S801 to S821 of the flow chart of FIG. 8, explanations thereof are almost omitted. Note that in the second embodiment, the condition that "the temperature of the detection element of the post-catalyst sensor 18 is not more than the predetermined temperature (for example, 850° C.)" is added to the abnormality preconditions of step S801. However, this condition need not be added to abnormality preconditions of step S1401. In this case, step S1401 is step S801 itself of the first embodiment.

When negative determination is performed since an output voltage of the post-catalyst sensor 18 is not less than a lean determination voltage in step S1405, a rich determination voltage is calculated in step S1409. The rich determination voltage is calculated by retrieving the data as represented in FIG. 12 or performing operation based on the data, based on the detected temperature of the detection element of the post-catalyst sensor 18 as explained in the second embodiment. As a result of this, for example, the rich determination voltage is set to be a value on a line represented in FIG. 12, or a value lower than it. Additionally, in next step S1411, it is determined whether or not the output voltage of the post-catalyst sensor 18 exceeds the rich determination voltage calculated in step S1409.

As described above, in the third embodiment, since the rich determination voltage (lean-side boundary value of the predetermined rich region) is calculated and set based on the temperature of the detection element of the post-catalyst sensor 18, the rich counter can be updated more appropriately in step S1413. Note that setting of the rich determination voltage is performed by the ECU 20 that performs a function as rich region setting means (a rich region setting unit).

Embodiments of the present invention are not limited only to the above-mentioned embodiments, all modification examples, application examples, and equivalents that are embraced in the concept of the present invention prescribed by claims are included in the present invention.

The invention claimed is:

1. A control device of an internal combustion engine, the internal combustion engine including an exhaust passage having an exhaust purification catalyst, an intake pipe including a throttle valve, a plurality of sensors, and a plurality of cylinders, each cylinder having a combustion chamber, a spark plug for igniting the air-fuel mixture in the combustion chamber, and an injector, the control device, comprising:

an electronic control unit (ECU) including a processor, memory, an input/output port connected to the plurality of sensors through a converter, the ECU controls the throttle valve, the spark plug, and the injector, the ECU programmed to:

execute air-fuel ratio control by controlling the amount of fuel injected by the injector based on an output of an air-fuel ratio sensor of the plurality of sensors provided at an upstream side of the exhaust purification catalyst of the exhaust passage, and execute correction to the air-fuel ratio control by a correction amount set based on an output of an oxygen sensor of the plurality of sensors provided at a downstream side of the exhaust purification catalyst;

calculate a value that represents an output tendency of the oxygen sensor based on the output of the oxygen sensor, and calculate a lean tendency value that represents a lean output tendency in a predetermined lean region closer to a lean side than a theoretical air-fuel ratio and a rich tendency value that represents a rich output tendency in a predetermined rich region closer to a rich side than the theoretical air-fuel ratio in a predetermined time based on data previously stored in the memory of the ECU;

determine whether or not a degree of the lean output tendency in the predetermined lean region is not less than a predetermined lean degree based on the lean tendency value calculated by the ECU, and determine whether or not a degree of the rich output tendency in the predetermined rich region is less than a predetermined rich degree based on the rich tendency value calculated by the ECU; and when the degree of the lean output tendency in the predetermined lean region is not less than the predetermined lean degree and the degree of the rich output tendency in the predetermined rich region is less than the predetermined rich degree, the ECU is further programmed to set a limit to the correction amount to the air-fuel ratio control by changing a rich-side guard value in a direction to more suppress enriching of the air-fuel ratio in the air-fuel ratio control as the degree of the lean output tendency of the oxygen sensor in the predetermined lean region increases and controlling the amount of fuel injected by the injector based on the rich-side guard value, and when the degree of the lean output tendency in the predetermined lean region is less than the predetermined lean degree and the degree of the rich output tendency in the predetermined rich region is more than the predetermined rich degree, the ECU is further programmed to prohibit changing of the rich-side guard value.

2. The control device of the internal combustion engine according to claim 1, the ECU further programmed to detect an element temperature of the oxygen sensor and the ECU is further programmed to calculate at least the rich tendency value based on the output of the oxygen sensor when the element temperature of the oxygen sensor is not more than a predetermined temperature having a correspondence relation with a lean-side boundary value of the predetermined rich region.

3. The control device of the internal combustion engine according to claim 1, the ECU further programmed to detect an element temperature of the oxygen sensor and the ECU is further programmed to set a lean-side boundary value of the predetermined rich region based on the element temperature of the oxygen sensor.

* * * * *